United States Patent
Nakatsugawa

(10) Patent No.: US 9,001,833 B2
(45) Date of Patent: Apr. 7, 2015

(54) RELAY APPARATUS, RECEPTION APPARATUS, AND COMMUNICATION SYSTEM

(71) Applicant: Fujitsu Limited, Kawasaki-shi, Kanagawa (JP)

(72) Inventor: Keiichi Nakatsugawa, Meguro (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 13/749,339

(22) Filed: Jan. 24, 2013

(65) Prior Publication Data
US 2013/0188648 A1    Jul. 25, 2013

(30) Foreign Application Priority Data
Jan. 25, 2012    (JP) .................................. 2012-013520

(51) Int. Cl.
| | | |
|---|---|---|
| *H04L 12/28* | (2006.01) | |
| *H04L 12/54* | (2013.01) | |
| *G01R 31/08* | (2006.01) | |
| *H04L 12/863* | (2013.01) | |
| *H04L 12/835* | (2013.01) | |
| *H04L 12/823* | (2013.01) | |
| H04L 12/801 | (2013.01) | |

(52) U.S. Cl.
CPC .............. *H04L 47/624* (2013.01); *H04L 47/30* (2013.01); *H04L 47/32* (2013.01); *H04L 47/34* (2013.01)

(58) Field of Classification Search
None
See application file for complete search history.

(56) References Cited

U.S. PATENT DOCUMENTS

| | | | | |
|---|---|---|---|---|
| 7,313,141 | B2 * | 12/2007 | Kan et al. ...................... | 370/394 |
| 7,768,919 | B1 * | 8/2010 | Conway ........................ | 370/232 |
| 2004/0160980 | A1 | 8/2004 | Miyoshi | |
| 2009/0232140 | A1 * | 9/2009 | Kitajima et al. .............. | 370/394 |

FOREIGN PATENT DOCUMENTS

| | | |
|---|---|---|
| JP | 2004-7029 A | 1/2004 |
| JP | 2004-080139 A | 3/2004 |

* cited by examiner

*Primary Examiner* — Hassan Phillips
*Assistant Examiner* — Hicham Foud
(74) *Attorney, Agent, or Firm* — Arent Fox LLP

(57) ABSTRACT

A relay apparatus in a communication system including a transmission apparatus, a reception apparatus, and a plurality of relay apparatuses which include the relay apparatus, including: a receiver receiving distributed sequential packets from the transmission apparatus which distributes sequential packets for the reception apparatus among the plurality of relay apparatuses, a memory storing distributed sequential packets of the sequential packets in sequential order, the distributed sequential packets are distributed and transmitted to the relay apparatus by the transmission apparatus, and a processor selecting a discard packet from the distributed sequential packets based on a discard condition, and to add a discard information to a previous packet and to transmit the previous packet, the discard information indicates a sequence number of the discard packet to be discarded, and the previous packet is one of the distributed sequential packets before the discard packet in sequential order.

13 Claims, 30 Drawing Sheets

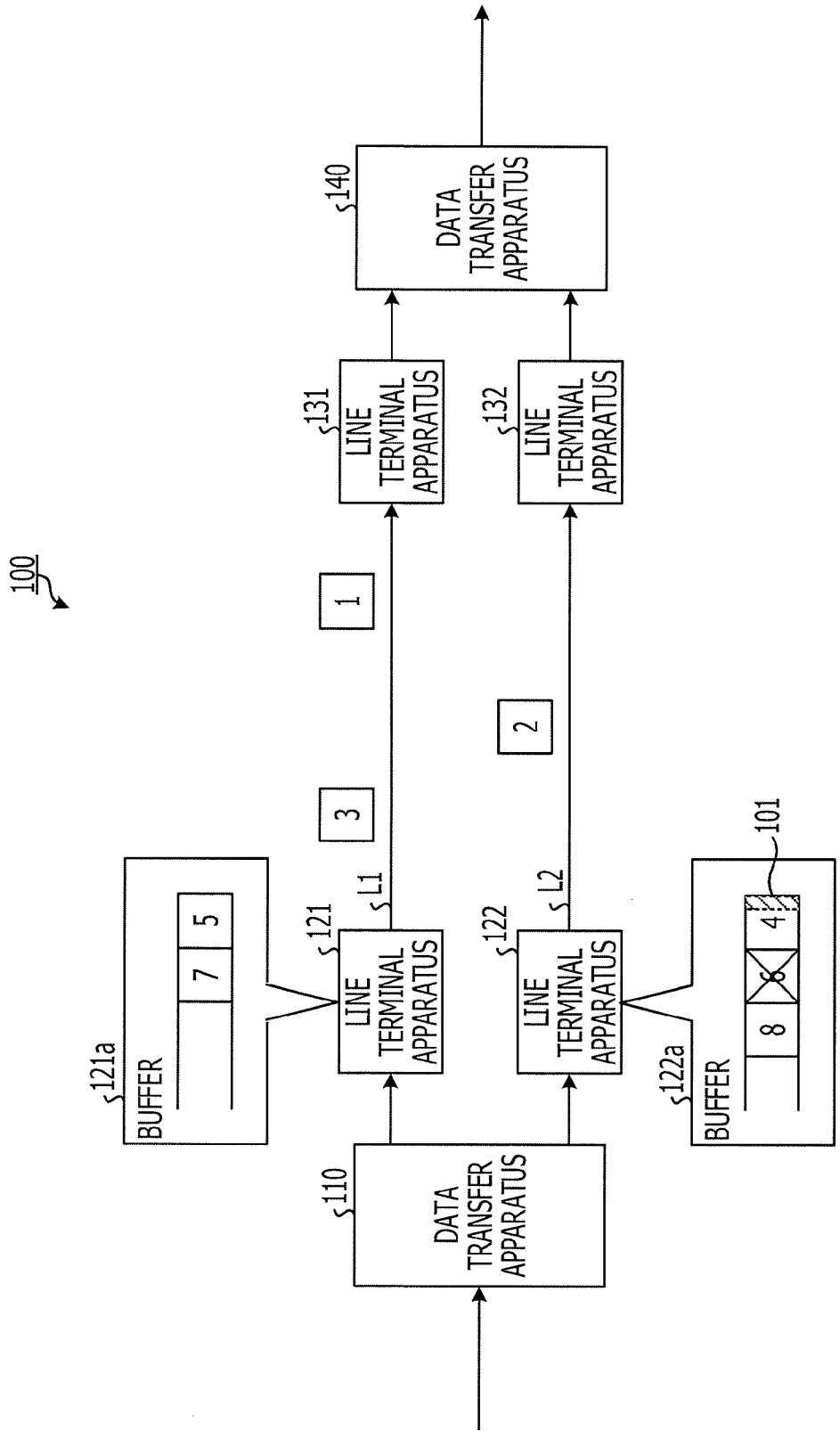

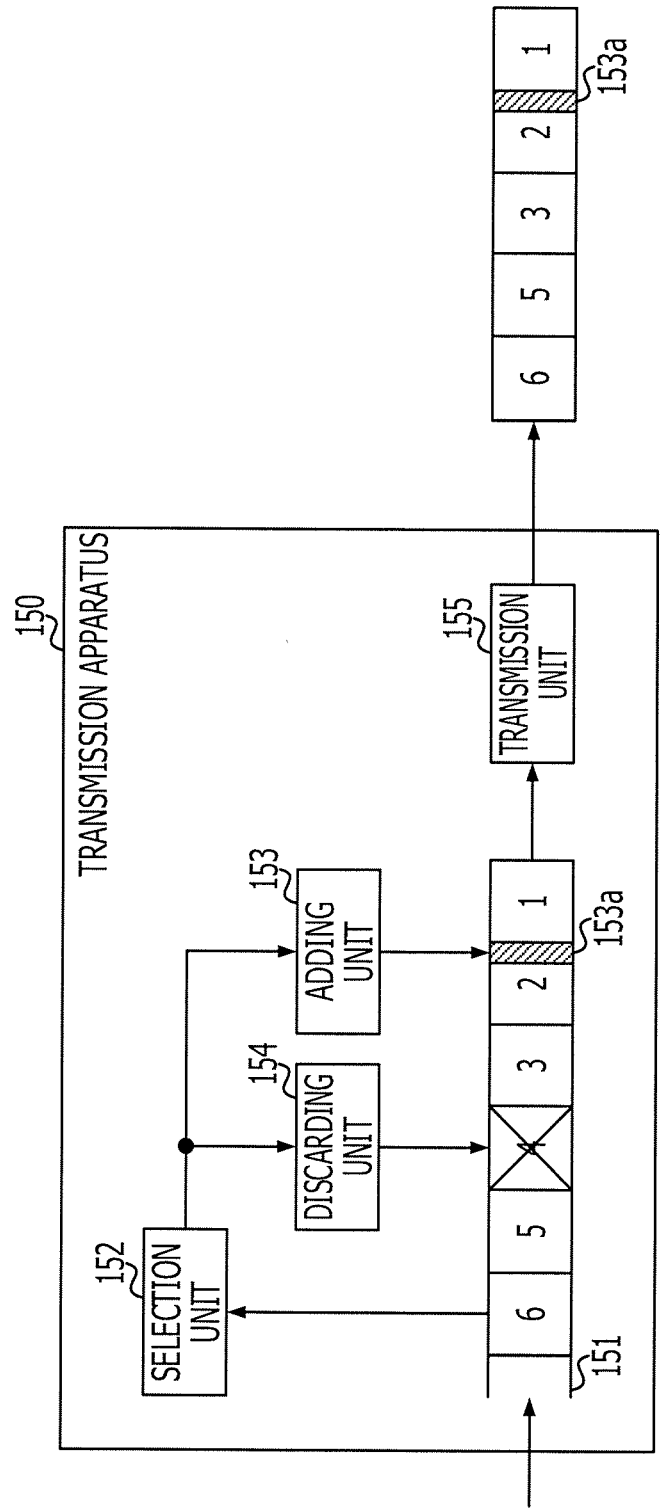

even when the data flows are assigned to the plurality of links, the order of the packets is ensured.

RELAY APPARATUS, RECEPTION APPARATUS, AND COMMUNICATION SYSTEM

CROSS-REFERENCE TO RELATED APPLICATIONS

This application is based upon and claims the benefit of priority of the prior Japanese Patent Application No. 2012-013520, filed on Jan. 25, 2012, the entire contents of which are incorporated herein by reference.

FIELD

The embodiments discussed herein are related to a relay apparatus, a reception apparatus, and a communication system.

BACKGROUND

In general, to realize high-speed data transmission in a communication system, link aggregation which uses a plurality of communication links as a single large-capacity link has been generally used. Examples of the link aggregation include the IEEE 802.3ad in which link aggregation is performed in a wired Ethernet link ("Ethernet" is a registered trademark).

Furthermore, a technique of efficiently using a link band by assigning data flows to a plurality of links has been generally used. In a configuration in which data flows are assigned to a plurality of links, packets and control messages of the data flows are also transmitted after being assigned to the links, and therefore, time points when the assigned packets arrive at a reception side through the links are different from one another. Therefore, an order of packets is inversed in a data flow in some cases.

To address this problem, sequence numbers are assigned to the transmitted packets after the data flows are identified on a transmission side, the packets are assigned to the plurality of links, and the order is corrected in accordance with the sequence numbers on the reception side. By this, even when the data flows are assigned to the plurality of links, the order of the packets is ensured.

Furthermore, a technique of detecting loss of a packet on a reception side caused by a transmission error and performing a process of transmitting a packet which is in a waiting state when the loss of a packet is detected has been generally used (refer to Japanese Laid-open Patent Publication No. 2004-80139, for example). In this technique, at a timing when a packet having a sequence number which is larger than that of a packet which is expected to be received is received, it is determined that the packet which is expected to be received is lost in transmission. Therefore, in this technique, a reception of a packet is waited until a packet having a sequence number which is larger than that of the packet which is expected to be received is received.

Moreover, a technique of notifying, when a transmission side detects a poor wireless environment in a certain frame, a transmission side of information representing that data is not to be transmitted in the frame has been generally used (refer to Japanese Laid-open Patent Publication No. 2004-7029, for example).

SUMMARY

According to an aspect of the invention, a relay apparatus in a communication system including a transmission apparatus and a reception apparatus which is coupled to the transmission apparatus through a plurality of communication routes via a plurality of relay apparatuses which include the relay apparatus and forward packets transmitted from the transmission apparatus for the reception apparatus, the relay apparatus includes: a receiver configured to receive distributed sequential packets from the transmission apparatus which distributes sequential packets for the reception apparatus among the plurality of relay apparatuses, a memory configured to store distributed sequential packets of the sequential packets in sequential order, the distributed sequential packets are distributed and transmitted to the relay apparatus by the transmission apparatus, and a processor configured to select a discard packet from the distributed sequential packets based on a discard condition, and to add a discard information to a previous packet and to transmit the previous packet, the discard information indicates a sequence number of the discard packet to be discarded, and the previous packet is one of the distributed sequential packets before the discard packet in sequential order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram illustrating a communication system according to a first embodiment (part 1);

FIG. 1C is a diagram illustrating a transmission apparatus according to the first embodiment;

DESCRIPTION OF EMBODIMENTS

In the related art described above, when a packet is discarded from a transmission buffer on a transmission side, the discarding of the packet is not swiftly detected on a reception side. Therefore, a problem arises in that a delay time is generated due to a period of time for waiting for a packet which is expected to arrive on the reception side.

Accordingly, it is desirable to provide a relay apparatus, a reception apparatus, a transmission system, a communication system, and a relay method which are capable of reducing the delay time.

Hereinafter, embodiments of a relay apparatus, a reception apparatus, a transmission system, a communication system, and a relay method according to this technique will be described in detail with reference to the accompanying drawings.

First Embodiment

Communication System of First Embodiment

Figure 1B:
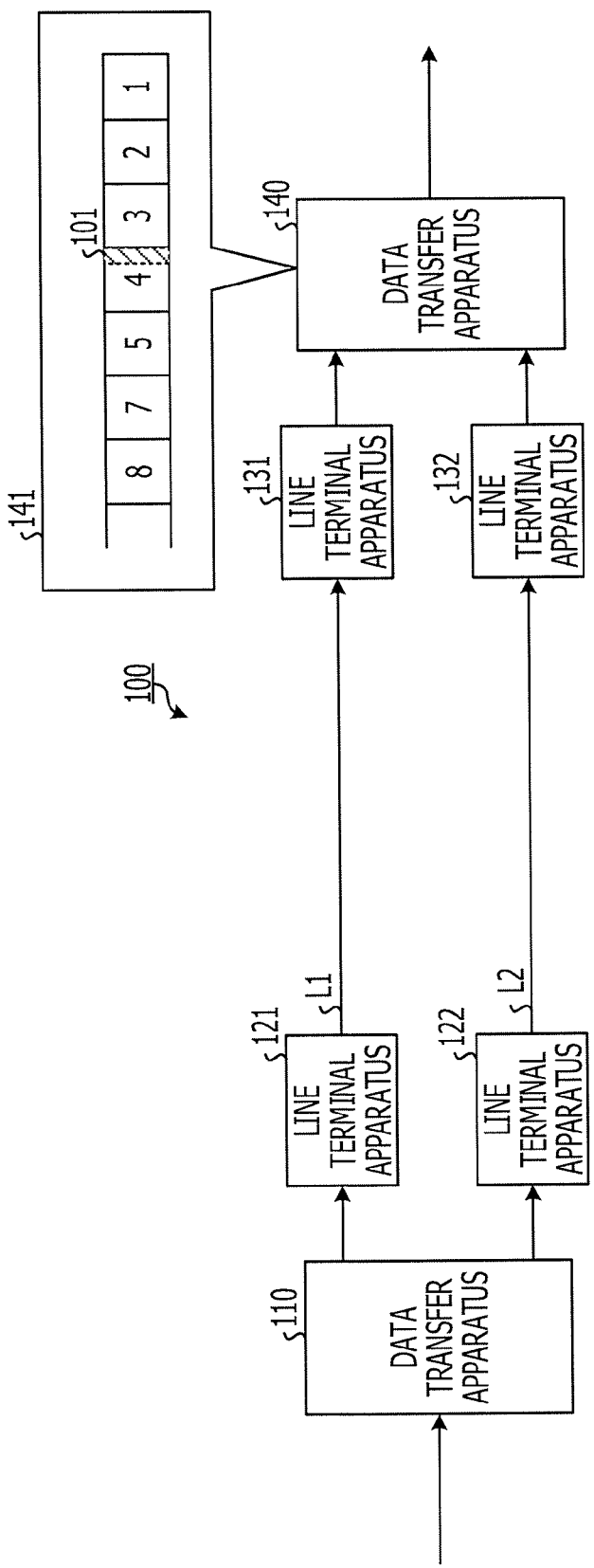
FIG. 1B is a diagram illustrating the communication system according to the first embodiment (part 2)

FIG. 1A is a diagram illustrating a communication system according to a first embodiment (part 1). FIG. 1B is a diagram illustrating the communication system according to the first embodiment (part 2). A communication system 100 illustrated in FIGS. 1A and 1B transmits data flows by link aggregation using links L1 and L2 (communication lines). The links L1 and L2 may be wireless links or wired links.

As illustrated in FIG. 1A, the communication system 100 includes a data transfer apparatus 110, line terminal apparatuses 121 and 122 (relay apparatuses), line terminal apparatuses 131 and 132, and a data transfer apparatus 140. The data transfer apparatus 110 and the line terminal apparatuses 121 and 122 constitute a transmission system which transmits data flow packets (transmission packets) assigned to the links L1 and L2.

The data transfer apparatus 110 receives data flows. The data transfer apparatus 110 has a function of an order adding unit which adds order information representing an order of packets to the packets of the received data flows. Alternatively, the data transfer apparatus 110 may receive packets to which order information has been added. In this case, the data transfer apparatus 110 may not have the function of the order adding unit which adds order information.

The order information is represented by a series of SNs (Sequence Numbers). Furthermore, the data transfer apparatus 110 has a function of assigning unit which assigns packets having SNs assigned thereto to the links L1 and L2. For example, the data transfer apparatus 110 obtains information such as transmission speeds of the links L1 and L2 and assigns the packets to the links L1 and L2 in accordance with the obtained information.

In the example illustrated in FIG. 1A, the data transfer apparatus 110 assigns packets having SNs of "1", "3", "5", and "7" to the link L1 and assigns packets having SNs of "2", "4", "6", and "8" to the link L2. The data transfer apparatus 110 transmits the packets assigned to the link L1 to the line terminal apparatus 121. Furthermore, the data transfer apparatus 110 transmits the packets assigned to the link L2 to the line terminal apparatus 122. The data transfer apparatus 110 and the line terminal apparatuses 121 and 122 perform wired communication or wireless communication with each other.

The line terminal apparatuses 121 and 122 are transmitters connected to the links L1 and L2, respectively. The line terminal apparatus 121 successively stores the packets transmitted from the data transfer apparatus 110 in an end of a buffer 121a of the line terminal apparatus 121. Furthermore, the line terminal apparatus 121 successively reads the packets from a beginning of the buffer 121a and transmits the packets to the link L1. The packets output to the link L1 are transmitted to the line terminal apparatus 131.

The line terminal apparatus 122 successively stores the packets transmitted from the data transfer apparatus 110 in an end of a buffer 122a of the line terminal apparatus 122. Then the line terminal apparatus 122 successively reads the packets from a beginning of the buffer 122a and transmits the packets to the link L2. The packets output to the link L2 are transmitted to the line terminal apparatus 132.

The line terminal apparatuses 131 and 132 are transmitters connected to the links L1 and L2, respectively, and terminate the links L1 and L2, respectively. The line terminal apparatus 131 transfers the packets transmitted from the line terminal apparatus 121 to the data transfer apparatus 140. The line terminal apparatus 132 transfers the packets transmitted from the line terminal apparatus 122 to the data transfer apparatus 140.

Furthermore, the line terminal apparatuses 121 and 122 discard a number of the packets included in the buffers 121a and 122a, respectively, when a packet discarding condition is satisfied. Specifically, the line terminal apparatuses 121 and 122 select packets to be discarded from among the packets stored in the buffers 121a and 122a, respectively, except for beginning packets of the buffers 121a and 122a when the discarding condition is satisfied.

The packet discarding condition is generated on the basis of free spaces of the buffers 121a and 122a, for example. Examples of the packet discarding condition include a condition in which the free spaces of the buffers 121a and 122a are smaller than a threshold value or a condition in which usage amounts of the buffers 121a and 122a exceed a threshold value. Furthermore, the discarding condition is not limited to the conditions generated on the basis of the free spaces of the buffers 121a and 122a. For example, the discarding condition may be generated on the basis of the transmission speeds of the links L1 and L2 or a traffic amount of packets transmitted from the data transfer apparatus 110.

For example, when detecting deterioration of the transmission speed of the link L2, the data transfer apparatus 110 reduces a rate of assignment of packets to the link L2 and increases a rate of assignment of packets to the link L1. In this case, a certain period of time is used until the rate of assignment of packets to the link L1 to assignment of packets to the link L2 is changed. Therefore, it is possible that the number of packets stored in the buffer 122a of the line terminal apparatus 122 is increased and the buffer 122a satisfies the packet discarding condition.

The line terminal apparatuses 121 and 122 discard the selected packets from the buffers 121a and 122a, respectively. Furthermore, the buffers 121a and 122a are capable of specifying SNs of the discarded packets and adding discarding information representing that the packets are discarded to packets which are stored in the buffers 121a and 122a before the packets of the discarding targets. The discarding information for specifying the SNs of the discarded packets includes the SNs of the discarded packets, for example. Alternatively, the discarding information for specifying the SNs of the discarded packets represents differences between the SNs of the discarded packets and SNs of packets to which the discarded information is to be added.

In the example of FIG. 1A, in the line terminal apparatus 122, it is assumed that a discarding condition is satisfied in a state in which the transmission speed of the link L2 is lowered after the packet having the SN of "2" is output, and the packets having the SNs of "4", "6", and "8" are still stored in the buffer 122a. In this case, the line terminal apparatus 122 selects a packet to be discarded from among the packets having the SNs of "6" and "8" which are not stored in the beginning of the buffer 122a. It is assumed that, in the example of in FIG. 1A, the line terminal apparatus 122 selects the packet having the SN of "6" as a discarding target.

Furthermore, the line terminal apparatus 122 adds discarding information 101 to the packet having the SN of "4" since only the packet having the SN of "4" is stored in the buffer 122a before the packet having the SN of "6" which is selected as the discarding target is stored. The discarding information 101 includes "6" which is the SN of the packet selected as the discarding target.

Furthermore, the discarding information 101 may include "2" which is a difference between "6" which is the SN of the packet selected as the discarding target and "4" which is the SN of the packet to which the discarding information 101 is to be added. By this, on the reception side, when the packet having the SN of "4" is received, "6" obtained by adding "2" which is the difference represented by the discarding information to "4" which is the SN of the received packet is determined to be an SN of a packet discarded on the transmission side. Specifically, when large SNs are coped with, a size of the discarding information 101 can be made smaller by incorporating a difference between SNs in the discarding information 101 when compared with a case where the SN itself is incorporated in the discarding information 101.

In the example illustrated in FIG. 1A, since the line terminal apparatus 122 discards the packet having the SN of "6", the packets having the SNs of "4" and "8" are successively read after the packet having the SN of "2" and the read packets are transmitted to the link L2. Furthermore, the discarding information 101 including "6" which is the SN of the discarded packet is added to the packet having the SN of "4".

On the other hand, it is assumed that the line terminal apparatus 121 transmits the packets stored in the buffer 121a to the link L1 without discarding any packet. Furthermore, it is assumed that, as a result, as illustrated in FIG. 1B, the data transfer apparatus 140 receives the packets having the SNs of "1", "2", "3" "4", "5", "7", and "8" in this order. An arrival order 141 represents an order of packets which arrive in the data transfer apparatus 140.

The data transfer apparatus 140 determines whether the packets have arrived in the right order in accordance with the SNs every time the data transfer apparatus 140 receives the packets, and successively outputs the packets which have been determined to arrive in the right order to a succeeding stage. Furthermore, when determining that a packet has not been arrived in the right order, the data transfer apparatus 140 waits another packet taking possibility of changing of the order of the packets into consideration. Thereafter, the data transfer apparatus 140 corrects the order of the packets and outputs the packets to the succeeding stage. The change of the order of the packets occurs since the packets are assigned to the links L1 and L2 and transmission times of the links L1 and L2 are different from each other.

In the example illustrated in FIG. 1B, the data transfer apparatus 140 determines that the packets having the SNs of "1" to "5" have arrived in the right order since the SNs are sequence numbers and outputs the packets to the succeeding stage. Furthermore, when receiving the packet having the SN of "4", the data transfer apparatus 140 can recognize a fact that the packet having the SN of "6" has been discarded on the transmission side in accordance with the discarding information 101 added to the packet having the SN of "4".

Therefore, although the packet having the SN of "7" is received after the packet having the SN of "5", that is, a number is skipped, the data transfer apparatus 140 does not wait the packet having the SN of "6" and outputs the packet having the SN of "7" to the succeeding stage. By this, when a packet is discarded on the transmission side, a reception of the discarded packet is not waited on the reception side and a delay time caused by waiting of the reception can be reduced. Furthermore, since the discarding information is added to a packet which is not a discarded packet, the discarding information can be transmitted without generating and transmitting a packet only used to transmit the discarding information. Accordingly, a delay time can be reduced.

Note that, although the configuration of the communication system 100 in which data flows are transmitted by the link aggregation using the links L1 and L2 has been described, the communication system 100 may have a configuration in which data flows are transmitted by link aggregation using three or more links.

Furthermore, although the configuration of the communication system 100 in which data flows are transmitted from the data transfer apparatus 110 to the data transfer apparatus 140 has been described, the communication system 100 may have a configuration in which data flows are also transmitted from the data transfer apparatus 140 to the data transfer apparatus 110.

Transmission Apparatus of First Embodiment

FIG. 1C is a diagram illustrating a transmission apparatus according to the first embodiment. A transmission apparatus 150 illustrated in FIG. 1C may be employed in the line terminal apparatuses 121 and 122 illustrated in FIGS. 1A and 1B, for example. Furthermore, in the communication system 100 illustrated in FIGS. 1A and 1B, in the case where data flows are also transmitted from the data transfer apparatus 140 to the data transfer apparatus 110, the transmission apparatus 150 may be employed in the line terminal apparatuses 131 and 132. Note that the transmission apparatus 150 is applicable to various transmission apparatuses which read and transmit packets stored in buffers in addition to the line terminal apparatuses 121 and 122 and the line terminal apparatuses 131 and 132.

As illustrated in FIG. 1C, the transmission apparatus 150 includes a buffer 151, a selection unit 152, an adding unit 153, a discarding unit 154, and a transmission unit 155. To the transmission apparatus 150, packets having order information representing numbers of the packets are successively input. The order information is represented by sequential SNs, for example.

The buffer 151 stores the packets input to the transmission apparatus 150 in order of the input. Accordingly, in the buffer 151, the packets supplied from the transmission apparatus 150 are stored in an order of the SNs. The buffer 151 is an FIFO (First In First Out) type buffer, for example. In the example of FIG. 1C, packets having SNs of "1" to "6" are stored in the buffer 151 in ascending order of the SNs.

The selection unit 152 selects a packet to be discarded from among the packets stored in the buffer 151 except for a beginning packet of the buffer 151 when the discarding condition is satisfied. In the example of FIG. 1C, the selection unit 152 selects at least one packet to be discarded from among the packets having the SNs of "2" to "6". It is assumed that, in the example of in FIG. 1C, the selection unit 152 selects the packet having the SN of "4" as a discarding target. The selection unit 152 notifies the adding unit 153 and the discarding unit 154 of the selected packet of the discarding target.

The discarding condition is generated on the basis of a free space of the buffer 151, for example. Examples of the packet discarding condition include a condition in which the free space of the buffer 151 is smaller than a threshold value and a condition in which a usage amount of the buffer 151 exceeds a threshold value. Furthermore, the discarding condition is not limited to the conditions based on the free space of the buffer 151. For example, the discarding condition may be generated on the basis of a transmission speed of the transmission unit 155 or a traffic amount of the packets input to the transmission apparatus 150.

The adding unit 153 adds discarding information 153*a* to a packet which is stored in the buffer 151 before a packet of a discarding target which is notified by the selection unit 152 is stored. In the example of FIG. 1C, the selection unit 153 adds the discarding information 153*a* to at least one of the packets having the SNs of "1" to "3". It is assumed that, in the example of FIG. 1C, the adding unit 153 adds the discarding information 153*a* to the packet having the SN of "2".

The discarding information 153*a* may be used to specify "4" which is the SN of the packet of the discarding target which is notified by the selection unit 152 and represents that the packet of the discarding target is discarded. The discarding information which can be used to specify the SN of the packet of the discarding target is information representing the SN of the discarded packet and information representing a difference between the SN of the discarded packet and an SN of a packet to which the discarded information is added, for example.

In the description below, a case where the discarding information 153*a* includes "4" which is the SN of the packet of the discarding target will be described. The adding unit 153 adds discarding information to a header of the packet having the SN of "2", for example. When the packet corresponds to an Ethernet frame, for example, the discarding information may be added to a region defined as a sub-header of the Ethernet frame.

The discarding unit 154 discards the packet of the discarding target which is notified by the selection unit 152 from the buffer 151. By this, the free space of the buffer 151 is increased. In the example of FIG. 1C, the discarding unit 154 discards the packet having the SN of "4" from the buffer 151.

The transmission unit 155 reads and transmits the packets stored in the buffer 151 in an order of storage in the buffer 151. Specifically, the transmission unit 155 successively reads the packets starting from a beginning of the buffer 151 and transmits the packets. The transmission unit 155 may be a wireless communication unit which transmits packets in a wireless manner or a wired communication unit which transmits packets in a wired manner.

The transmission unit 155 transmits the packets to a reception apparatus which corrects an order of the packets in accordance with the SNs of the packets, for example. The correction of an order of the packets is a process of sorting the packets in an order of the SNs and outputting the sorted packets. Furthermore, when receiving the packet to which the discarding information is added, the reception apparatus which receives the packets from the transmission unit 155 outputs packets having SNs which are later than the SN specified by the discarding information without waiting a packet having the SN specified by the discarding information.

In the example of FIG. 1C, since the packet having the SN of "4" is discarded by the discarding unit 154, the transmission unit 155 sequentially reads and transmits the packets having the SNs of "1", "2", "3", "5", and "6". Furthermore, the discarding information 153*a* has been added to the packet having the SN of "2" transmitted by the transmission unit 155.

By this, the reception side can receive a notification representing that the packet having the SN of "4" has been discarded on the transmission side before a lack of the packet having the SN of "4" is detected on the reception side. Specifically, the communication apparatus on the reception side can recognize that the packet having the SN of "4" has been discarded on the transmission side in accordance with the discarding information 153*a* added to the received packet when receiving the packet having the SN of "2". By this, the communication apparatus on the reception side can perform a process of receiving the packets having the SNs of "5" and "6" without waiting for the packet having the SN of "4". Accordingly, a delay time caused by waiting of a reception can be reduced.

Configuration of Data Transfer Apparatus on Transmission Side

Figure 2:
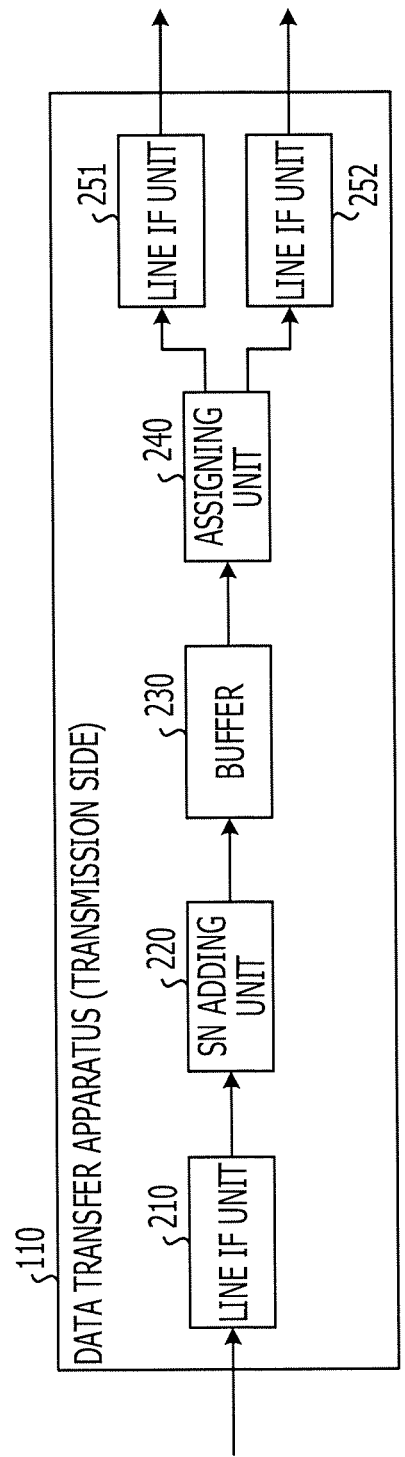
FIG. 2 is a diagram illustrating a configuration of a data transfer apparatus on a transmission side.

FIG. 2 is a diagram illustrating a configuration of the data transfer apparatus on the transmission side. As illustrated in FIG. 2, the data transfer apparatus 110 on the transmission side includes a line IF unit 210, an SN adding unit 220, a buffer 230, an assigning unit 240, and line IF units 251 and 252.

The line IF unit 210 receives a packet from a communication apparatus (such as a user apparatus) in a preceding stage of the data transfer apparatus 110. The line IF unit 210 outputs the received packet to the SN adding unit 220. The SN adding unit 220 adds an SN to the packet output from the line IF unit 210. The SN added by the SN adding unit 220 is increased by one every packet. The SN adding unit 220 stores the packet having the SN added thereto in an end of the buffer 230.

The assigning unit 240 sequentially reads packets stored in the buffer 230 from the beginning and assigns the read packets to the links L1 and L2. The assigning unit 240 outputs the packets assigned to the link L1 to the line IF unit 251. Furthermore, the assigning unit 240 outputs the packets assigned to the link L2 to the line IF unit 252. The line IF unit 251 transmits the packets output from the assigning unit 240 to the line terminal apparatus 121. The line IF unit 252 transmits the packets output from the assigning unit 240 to the line terminal apparatus 122.

Each of the line IF units 210, 251, and 252 can be realized by a wired or wireless communication interface, for example. Each of the SN adding unit 220 and the assigning unit 240 can be realized by software such as firmware and hardware such as a processor, a memory, or a digital electronic circuit. The buffer 230 can be realized by a memory, for example. Examples of the processor include a CPU (Central Processing Unit) and a DSP (Digital Signal Processor). Examples of the memory include a RAM (Random Access Memory) and a ROM (Read Only Memory). Examples of the digital electronic circuit include an ASIC (Application Specific Integrated Circuit), an FPGA (Filed-Programming Gate Array), and an LSI (Large Scale Integration).

Configuration of Line Terminal Apparatus on Transmission Side

Figure 3:
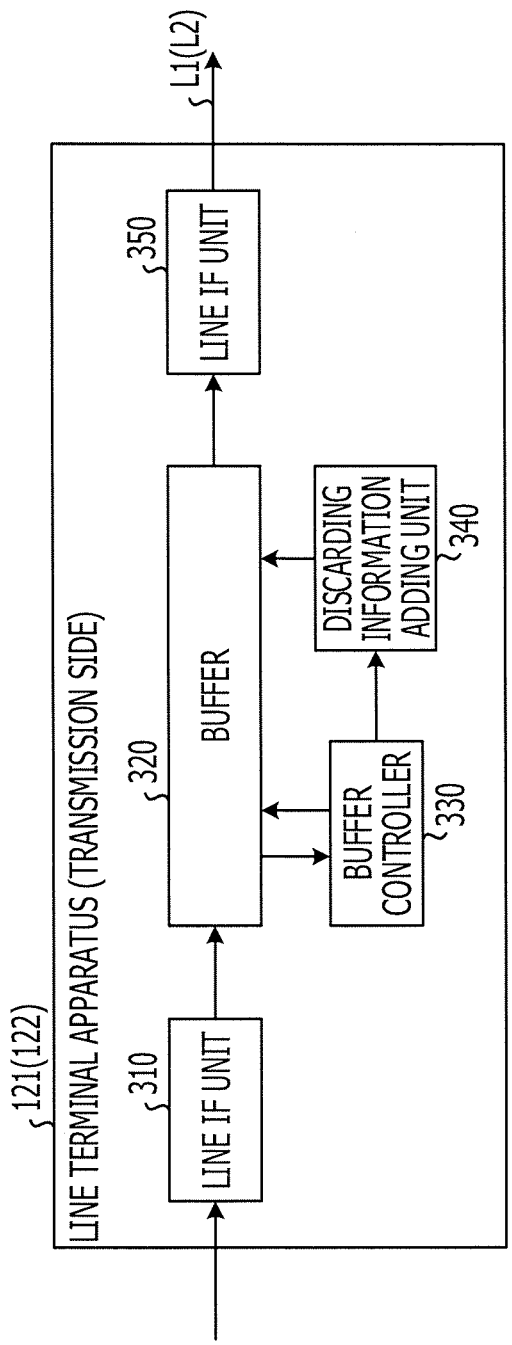
FIG. 3 is a diagram illustrating a configuration of a line terminal apparatus on the transmission side.

FIG. 3 is a diagram illustrating a configuration of the line terminal apparatus on the transmission side. Although the configuration of the line terminal apparatus 121 will be described with reference to FIG. 3, the line terminal apparatus 122 has the same configuration. As illustrated in FIG. 3, the line terminal apparatus 121 includes a line IF unit 310, a buffer 320, a buffer controller 330, a discarding information adding unit 340, and a line IF unit 350. The line IF unit 310 receives a packet transmitted from the data transfer apparatus 110. The line IF unit 310 stores the received packet in an end of the buffer 320.

The buffer controller 330 monitors a usage amount of the buffer 320. The usage amount represents a ratio of capacity which is currently used in the maximum storage capacity of the buffer 320, for example. When the usage amount of the buffer 320 exceeds a threshold value, the buffer controller 330 selects a packet of a discarding target from among packets stored in the buffer 320 other than a beginning packet.

Thereafter, the buffer controller 330 extracts an SN of the packet selected as the discarding target. The buffer controller 330 notifies the discarding information adding unit 340 of the extracted SN. Furthermore, the buffer controller 330 discards (deletes, for example) the selected packet from the buffer 320. By this, the free space of the buffer 320 is increased.

When receiving the SN from the buffer controller 330, the discarding information adding unit 340 selects a notification packet to which discarding information is to be added from among packets have SNs which are smaller than the notified SN and which have been stored in the buffer 320. By this, the notification packet can be selected from among the packets which are stored before the discarded packet. The discarding information adding unit 340 adds the discarding information including the SN notified by the buffer controller 330 to the selected notification packet.

The line IF unit 350 sequentially reads the packets stored in the buffer 320 from the beginning and transmits the read packets through the links L1. Note that the line IF unit 350 of the line terminal apparatus 122 transmits read packets through the link L2.

Each of the line IF units 310 and 350 can be realized by a wired or wireless communication interface, for example. Each of the buffer controller 330 and the discarding information adding unit 340 can be realized by software such as firmware and hardware such as a processor, a memory, or a digital electronic circuit. The buffer 320 can be realized by a memory, for example. Examples of the processor include a CPU (Central Processing Unit) and a DSP (Digital Signal Processor). Examples of the memory include a RAM (Random Access Memory) and a ROM (Read Only Memory). Examples of the digital electronic circuit include an ASIC (Application Specific Integrated Circuit), an FPGA (Filed-Programming Gate Array), and an LSI (Large Scale Integration).

The buffer 151 illustrated in FIG. 1C may be realized by the buffer 320, for example. The selection unit 152 and the discarding unit 154 illustrated in FIG. 1C may be realized by the buffer controller 330, for example. The adding unit 153 illustrated in FIG. 1C may be realized by the discarding information adding unit 340, for example. The transmission unit 155 illustrated in FIG. 1C may be realized by the line IF unit 350, for example.

Configuration of Line Terminal Apparatus on Reception Side

Figure 4:
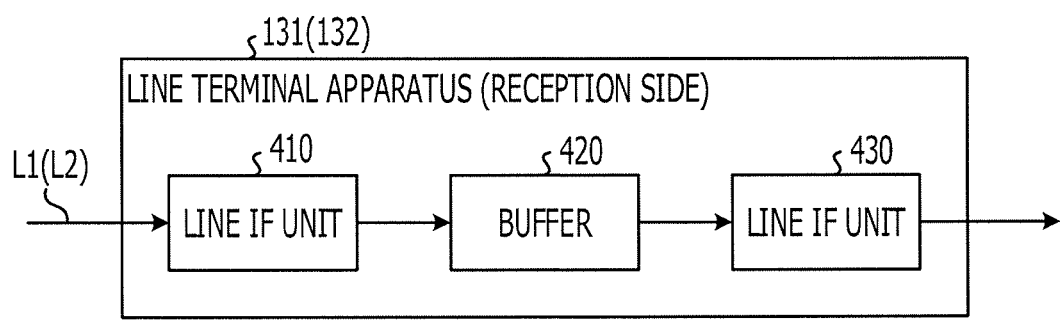
FIG. 4 is a diagram illustrating a configuration of a line terminal apparatus on a reception side.

FIG. 4 is a diagram illustrating a configuration of the line terminal apparatus on the reception side. Although a configuration of the line terminal apparatus 131 will be described with reference to FIG. 4, the line terminal apparatus 132 has the same configuration. As illustrated in FIG. 4, the line terminal apparatus 131 includes a line IF unit 410, a buffer 420, and a line IF unit 430.

The line IF unit 410 receives a packet transmitted from the line terminal apparatus 121 through the link L1. Note that the line IF unit 410 of the line terminal apparatus 132 receives a packet transmitted from the line terminal apparatus 122 through the link L2. The line IF unit 410 stores the received packet in an end of the buffer 420. The line IF unit 430 sequentially reads packets stored in the buffer 420 from a beginning. Then the line IF unit 430 transmits the read packets to the data transfer apparatus 140.

Configuration of Data Transfer Apparatus on Reception Side

Figure 5:
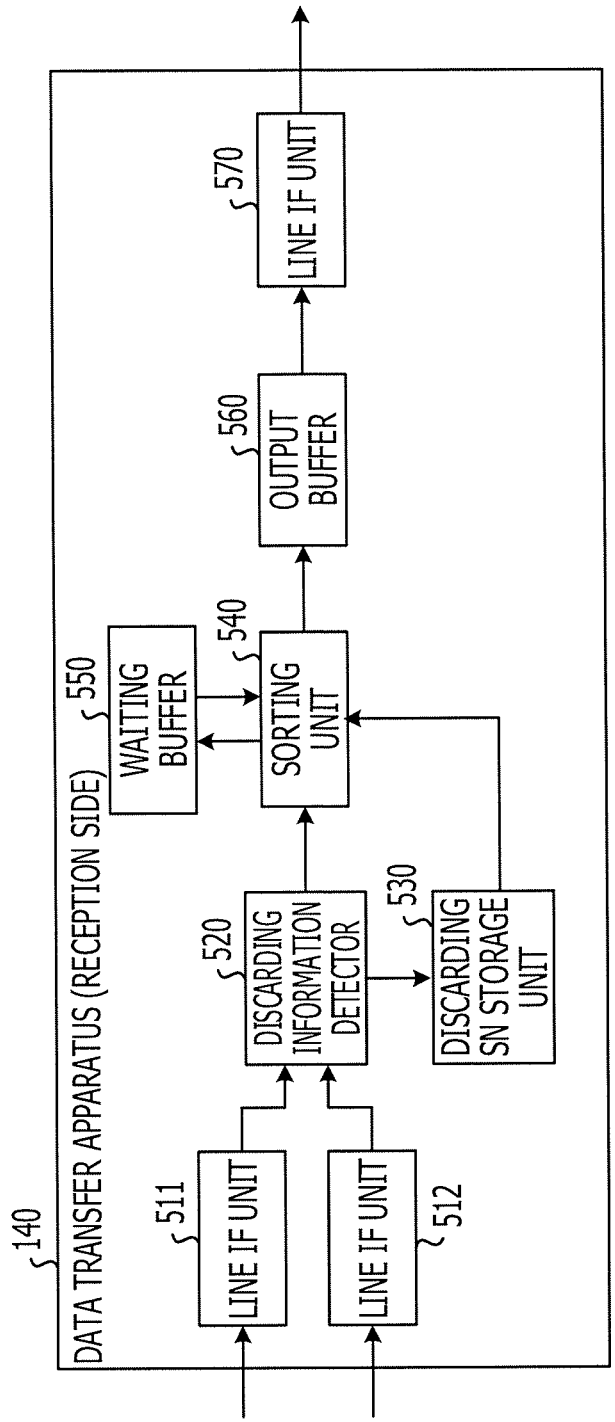
FIG. 5 is a diagram illustrating a configuration of a data transfer apparatus on the reception side.

FIG. 5 is a diagram illustrating a configuration of the data transfer apparatus on the reception side. As illustrated in FIG. 5, the data transfer apparatus 140 on the reception side includes line IF units 511 and 512, a discarding information detector 520, a discarding SN storage unit 530, a sorting unit 540 a waiting buffer 550, an output buffer 560, and a line IF unit 570.

The line IF unit 511 receives a packet transmitted from the line terminal apparatus 131. The line IF unit 511 outputs the received packet to the discarding information detector 520. The line IF unit 512 receives a packet transmitted from the line terminal apparatus 132. The line IF unit 512 outputs the received packet to the discarding information detector 520.

The discarding information detector 520 detects discarding information included in the packets output from the line IF units 511 and 512. When detecting the discarding information, the discarding information detector 520 causes the discarding SN storage unit 530 to store SNs included in the detected discarding information as discarding SNs. Furthermore, when detecting the discarding information, the discarding information detector 520 deletes the detected discarding information from the packets. Furthermore, the discarding information detector 520 outputs the packets output from the line IF units 511 and 512 to the sorting unit 540.

The sorting unit 540 extracts SNs added to the packets output from the discarding information detector 520 and corrects order of the packets received by the data transfer apparatus 140 in accordance with the extracted SNs. Specifically, when an SN of a packet output from the discarding information detector 520 is larger than a preceding SN by one, the sorting unit 540 determines that the packet has properly arrived and stores the packet output from the discarding information detector 520 in the output buffer 560.

Furthermore, when an SN of a packet output from the discarding information detector 520 is larger than a preceding SN by two or more, the sorting unit 540 determines that at least one packet has not properly arrived and stores the packet output from the discarding information detector 520 in the waiting buffer 550. Note that, when an SN between the SN of the packet output from the discarding information detector 520 and the preceding SN corresponds to the discarding SN stored in the discarding SN storage unit 530, the sorting unit 540 stores the packet in the output buffer 560 even when the SN of the packet is larger than the preceding packet by two or more.

Furthermore, the SN of the packet output from the discarding SN storage unit 530 is between a preceding SN and an SN of a packet stored in the waiting buffer 550, the sorting unit 540 causes the output buffer 560 to store the output packet. Then, when an SN of a packet stored in the waiting buffer 550 is larger than an SN of a packet stored in the output buffer 560 by one, the sorting unit 540 reads the packet stored in the waiting buffer 550 and causes the output buffer 560 to store the packet.

The line IF unit 570 sequentially reads packets stored in the output buffer 560 from the beginning. Then the line IF unit 570 transmits the read packets to a communication apparatus (a user apparatus, for example) in a succeeding stage of the data transfer apparatus 140.

Each of the line IF units 511, 512, and 570 may be realized by a wired or wireless communication interface, for example. Each of the discarding information detector 520 and the sorting unit 540 may be realized by software such as firmware and hardware such as a processor, a memory, or a digital electronic circuit. Each of the discarding SN storage unit 530, the waiting buffer 550, and the output buffer 560 may be realized by a memory, for example. Examples of the processor include a CPU (Central Processing Unit) and a DSP (Digital Signal Processor). Examples of the memory include a RAM (Random Access Memory) and a ROM (Read Only Memory). Examples of the digital electronic circuit include an ASIC (Application Specific Integrated Circuit), an FPGA (Filed-Programming Gate Array), and an LSI (Large Scale Integration).

Process of Data Transfer Apparatus on Transmission Side

Figure 6:
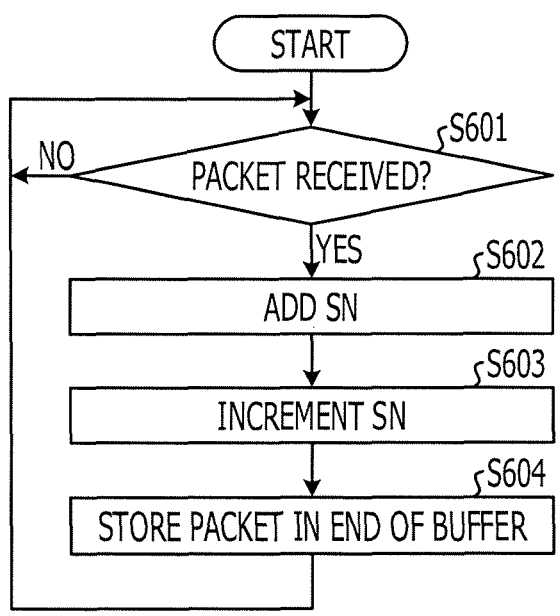
FIG. 6 is a flowchart illustrating a reception process performed by the data transfer apparatus on the transmission side.

FIG. 6 is a flowchart illustrating a reception process performed by the data transfer apparatus on the transmission side. The data transfer apparatus 110 on the transmission side performs the following processes, for example. First, the line IF unit 210 determines whether a packet has been received from a communication apparatus in a preceding stage of the data transfer apparatus 110 (S601) and waits until a packet is received (S601: proceeds to a loop of "No"). When a packet is received (S601: Yes), the SN adding unit 220 adds an SN to the received packet (S602).

Next, the SN adding unit 220 increments the SN (S603). Thereafter, the SN adding unit 220 stores the packet having the SN added thereto in an end of the buffer 230 (S604), and the process returns to S601. By performing the processes above, when receiving a packet, the data transfer apparatus 110 adds an SN to the received packet and stores the packet having the SN added thereto in the buffer 230.

Figure 7:
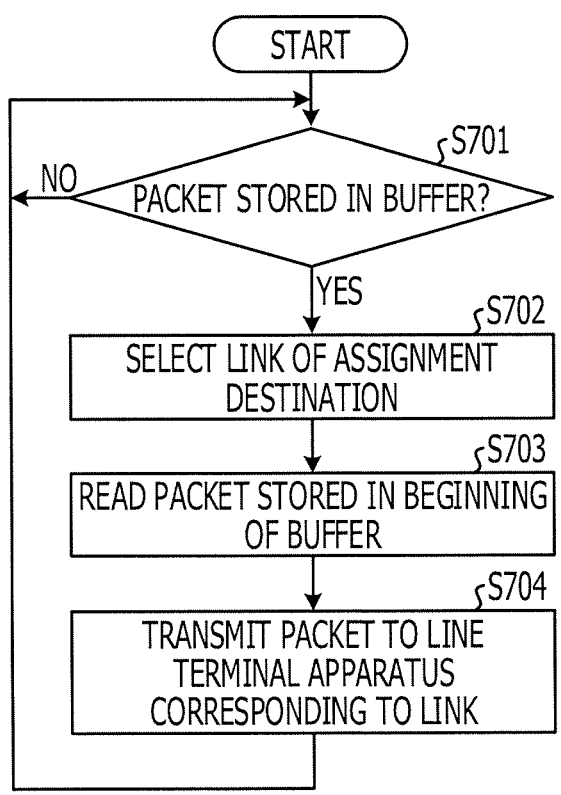
FIG. 7 is a flowchart illustrating a transmission process performed by the data transfer apparatus on the transmission side.

FIG. 7 is a flowchart illustrating a transmission process performed by the data transfer apparatus on the transmission side. The data transfer apparatus 110 on the transmission side performs the following processes in addition to the reception operation illustrated in FIG. 6. First, the assigning unit 240 determines whether a packet has been stored in the buffer 230 (S701) and waits until a packet is stored in the buffer 230 (S701: proceeds to a loop of "No").

In S701, when at least one packet is stored in the buffer 230 (S701: Yes), the assigning unit 240 selects one of the links L1 and L2 to which the packet stored in the beginning of the buffer 230 is to be assigned (S702). The assigning unit 240 selects one of the links L1 and L2 to which the packet is to be assigned taking the transmission speeds of the links L1 and L2 into consideration.

Thereafter, the assigning unit 240 reads the packet stored in the beginning of the buffer 230 (S703). Subsequently, the assigning unit 240 transmits the packet read in S703 to one of the line terminal apparatuses 121 and 122 which corresponds to one of the links L1 and L2 selected in S702 (S704), and the process returns to S701.

In S704, the assigning unit 240 outputs the packet to one of the line IF units 251 and 252 which corresponds to the selected one of the links L1 and L2 so as to transmit the packet to one of the line terminal apparatuses 131 and 132 which corresponds to the selected one of the links L1 and L2. By performing the processes above, the data transfer apparatus 110 assigns a packet stored in the buffer 230 by the reception process illustrated in FIG. 6 to one of the links L1 and L2.

Process of Line Terminal Apparatus on Transmission Side

Figure 8:
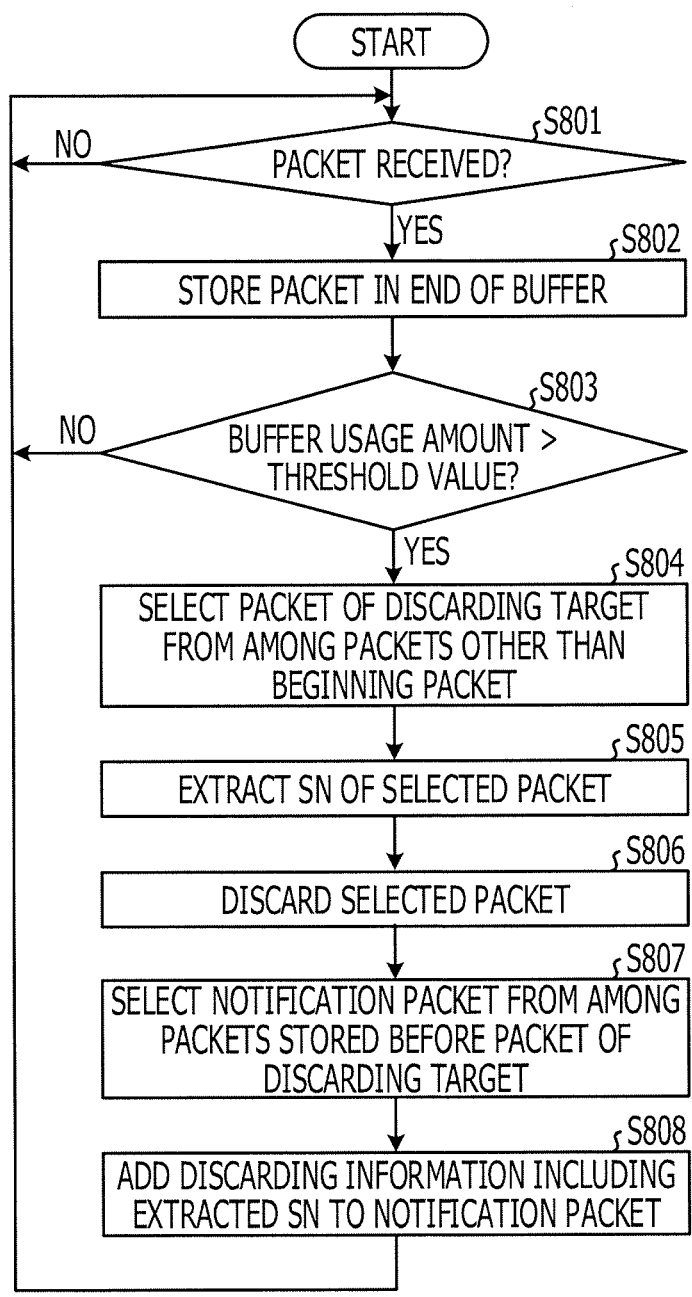
FIG. 8 is a flowchart illustrating a reception process performed by the line terminal apparatus on the transmission side.

FIG. 8 is a flowchart illustrating a reception process performed by the line terminal apparatus on the transmission side. Here, although a reception process performed by the line terminal apparatus 121 will be described, the line terminal apparatus 122 also performs the same reception process. The line terminal apparatus 121 performs the following processes, for example. First, the line IF unit 310 determines whether a packet has been received from the data transfer apparatus 110 (S801) and waits until a packet is received (S801: proceeds to a loop of "No"). When a packet is received (S801: Yes), the line IF unit 310 stores the received packet in the end of the buffer 320 (S802).

Subsequently, the buffer controller 330 determines whether the usage amount of the buffer 320 exceeds the threshold value (S803). When the usage amount of the buffer 320 does not exceed the threshold value (S803: No), the line terminal apparatus 121 returns to S801. When the usage amount of the buffer 320 exceeds the threshold value (S803: Yes), the buffer controller 330 selects a packet of a discarding target from among packets which are stored in the buffer 320 other than a beginning packet (S804).

Then the buffer controller 330 extracts an SN of the packet selected in S804 (S805). Subsequently, the buffer controller 330 discards the packet selected in S804 from the buffer 320 (S806). Thereafter, the discarding information adding unit 340 selects a notification packet to which discarding information is to be added from among packets which are stored in the buffer 320 before the packet of the discarding target selected in S804 is stored (S807).

Then the discarding information adding unit 340 adds the discarding information including the SN extracted in S805 to the notification packet selected in S807 (S808), and the process returns to S801.

By performing the processes above, when the usage amount of the buffer 320 exceeds the threshold value, the line terminal apparatus 121 discards a packet stored in the buffer 320 and adds discarding information including an SN of the discarded packet to a packet having an SN which is smaller than that of the discarded packet.

Figure 9:
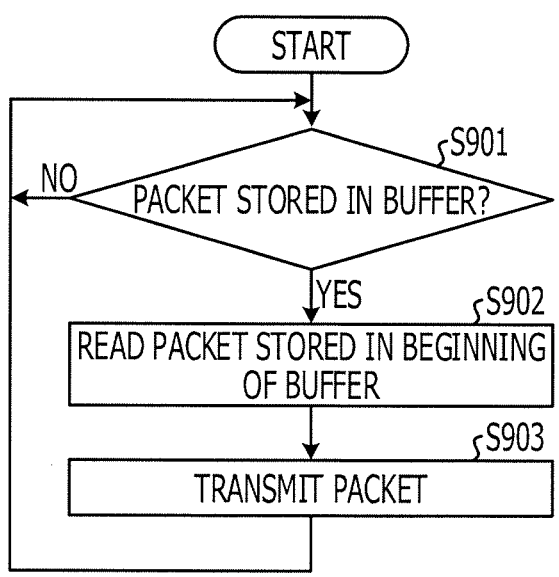
FIG. 9 is a flowchart illustrating a transmission process performed by the line terminal apparatus on the transmission side.

FIG. 9 is a flowchart illustrating a transmission process performed by the line terminal apparatus on the transmission side. Here, although a transmission process performed by the line terminal apparatus 121 will be described, the line terminal apparatus 122 also performs the same transmission process. The line terminal apparatus 121 performs the following processes, for example, in addition to the reception process illustrated in FIG. 8.

First, the line IF unit 350 determines whether at least one packet has been stored in the buffer 320 (S901) and waits until a packet is stored in the buffer 320 (S901: proceeds to a loop of "No"). When at least one packet is stored in the buffer 320 (S901: Yes), the line IF unit 350 reads the packet stored in the beginning of the buffer 320 (S902).

Thereafter, the line IF unit 350 transmits the packet read in S902 (S903), and the process returns to S901. By performing the processes above, the data transfer apparatus 121 transmits a packet stored in the buffer 320 by the reception process illustrated in FIG. 8 through the link L1.

Process of Data Transfer Apparatus on Reception Side

Figure 10:
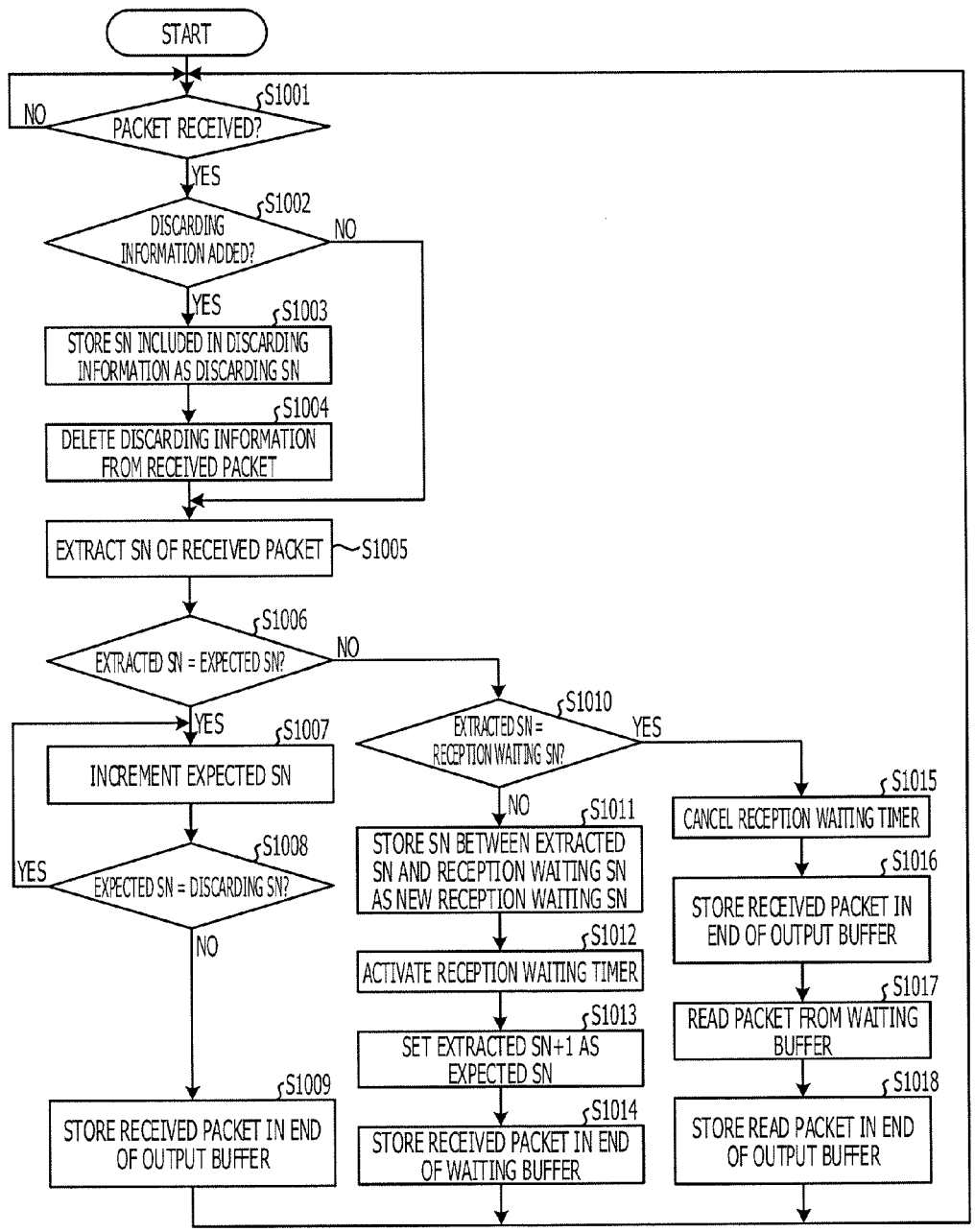
FIG. 10 is a flowchart illustrating a reception process performed by the data transfer apparatus on the reception side.

FIG. 10 is a flowchart illustrating a reception process performed by the data transfer apparatus on the reception side. The data transfer apparatus 140 on the reception side performs the following processes, for example. First, one of the line IF units 511 and 512 determines whether a packet has been received from a corresponding one of the line terminal apparatuses 131 and 132 (S1001) and waits until a packet is received (S1001: proceeds to a loop of "No"). When a packet is received (S1001: Yes), the discarding information detector 520 determines whether discarding information has been added to the packet received in S1001 (S1002).

When it is determined that the discarding information has not been added in S1002 (S1002: No), the data transfer apparatus 140 proceeds to S1005. On the other hand, when the discarding information has been added (S1002: Yes), the discarding information detector 520 causes the discarding SN storage unit 530 to store an SN included in the discarding information added to the packet as a discarding SN (S1003).

Thereafter, the discarding information detector 520 deletes the discarding information from the packet received in S1001 (S1004). Subsequently, the sorting unit 540 extracts an SN of the packet received in S1001 (S1005). Then the sorting unit 540 determines whether the SN extracted in S1005 is the same as an expected SN (S1006). The expected SN has been stored in a memory of the data transfer apparatus 140, for example. An initial value of the expected SN is the same as an initial value of an SN added by the data transfer apparatus 110.

In S1006, when the extracted SN is the same as the expected SN (S1006: Yes), it is determined that an expected packet has properly arrived. In this case, the sorting unit 540 increments the expected SN (S1007). Thereafter, it is determined whether the expected SN incremented in S1007 is the same as the discarding SN stored in S1003 (S1008).

In S1008, when the expected SN is the same as the discarding SN (S1008: Yes), it is determined that a packet represented by the expected SN has been discarded on the transmission side. In this case, the sorting unit 540 returns to S1007 where the expected SN is incremented. By this, an SN of a packet supplied immediately after the discarded packet is determined to be the expected SN, and accordingly, a reception of the discarded packet is not waited.

In S1008, when the expected SN is not the same as the discarding SN (S1008: No), it is determined that a packet represented by the expected SN has not been discarded on the transmission side. In this case, the sorting unit 540 stores the packet received in S1001 in an end of the output buffer 560 (S1009) and the process returns to S1001.

In S1006, when the extracted SN is not the same as the expected SN (S1006: No), it is determined that an expected packet has not properly arrived. In this case, the sorting unit 540 determines whether the extracted SN is the same as a reception waiting SN (S1010). The reception waiting SN has been stored in a memory of the data transfer apparatus 140, for example. In an initial state, the reception waiting SN is cleared. In S1010, when the reception waiting SN has been cleared, it is determined that the extracted SN is not the same as the reception waiting SN.

In S1010, when the extracted SN is not the same as the reception waiting SN (S1010: No), it is determined that a skip has occurred between the extracted SN and the reception waiting SN. In this case, the sorting unit 540 stores an SN between the extracted SN and the reception waiting SN as another reception waiting SN in the memory of the data transfer apparatus 140 so as to wait a packet having an SN which has been skipped (S1011).

Next, the sorting unit 540 activates a reception waiting timer used to count a predetermined period of time (S1012). The predetermined period of time counted by the reception waiting timer corresponds to the maximum period of time for waiting a packet when it is possible that an order of packets is changed. Subsequently, the sorting unit 540 sets the extracted SN+1 as the expected SN (S1013) before the sorting unit 540 stores the packet received in S1001 in an end of the waiting buffer 550 (S1014). Thereafter, the process returns to S1001.

In S1010, when the extracted SN is the same as the reception waiting SN (S1010: Yes), it is determined that a packet having an SN which had been skipped has been arrived. In this case, the sorting unit 540 cancels the reception waiting timer activated in S1012 (S1015).

Subsequently, the sorting unit 540 stores the packet received in S1001 in the end of the output buffer 560 (S1016). Thereafter, the sorting unit 540 reads a packet stored in the waiting buffer 550 (S1017). Then the sorting unit 540 stores the packet read in S1017 in the end of the output buffer 560 (S1018) and the process returns to S1001.

By performing the processes above, the data transfer apparatus 140 sorts received packets in accordance with SNs of the packets and sequentially stores the packets which have been sorted in the output buffer 560. Furthermore, the data transfer apparatus 140 forcibly increments the counter (expected SN) in S1007 so as not to wait a reception of a discarded packet represented by an SN of the discarded packet.

Figure 11:
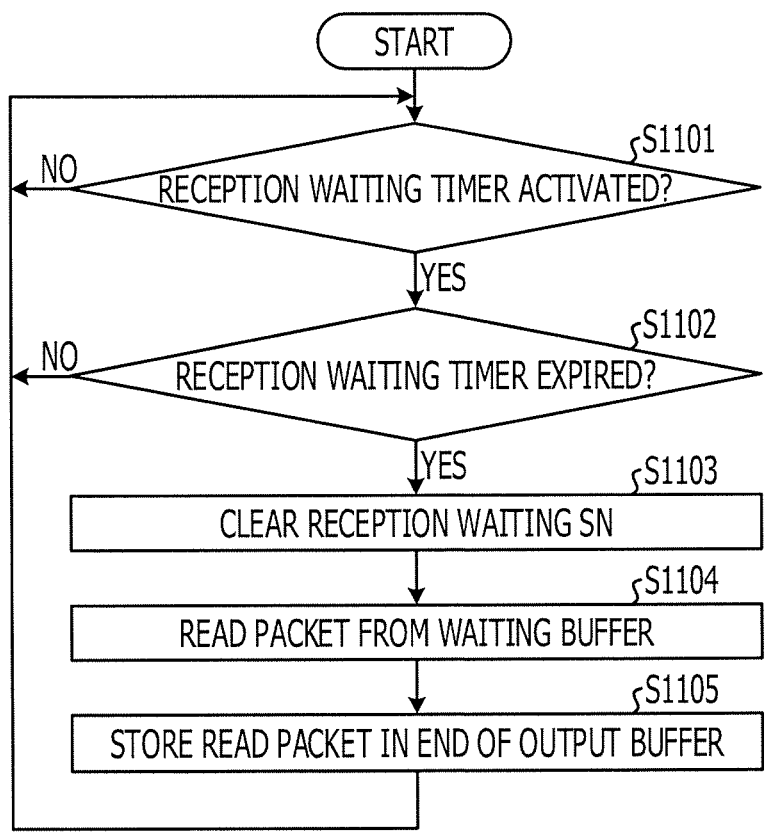
FIG. 11 is a flowchart illustrating a timer management process performed by the data transfer apparatus on the reception side.

FIG. 11 is a flowchart illustrating a timer management process performed by the data transfer apparatus on the reception side. The data transfer apparatus 140 performs the following processes, for example, in addition to the reception process illustrated in FIG. 10. First, the sorting unit 540 determines whether the reception waiting timer has been activated in S1012 of FIG. 10 (S1101).

In S1101, when the reception waiting timer has not been activated (S1101: No), the data transfer apparatus 140 returns to S1101. When the reception waiting timer has been activated (S1101: Yes), the sorting unit 540 determines whether a reception waiting timer has expired (S1102).

In S1102, when the reception waiting timer has not expired (S1102: No), the data transfer apparatus 140 returns to S1101. When the reception waiting timer has expired (S1102: Yes), the sorting unit 540 clears the reception waiting SN (S1103).

Thereafter, the sorting unit 540 reads a packet stored in the waiting buffer 550 (S1104). Then the sorting unit 540 stores the packet read in S1104 in the end of the output buffer 560 (S1105) and the process returns to S1101. By performing the processes above, the data transfer apparatus 140 terminates waiting of a packet when the packet to be received does not arrive for a predetermined period of time or more.

Figure 12:
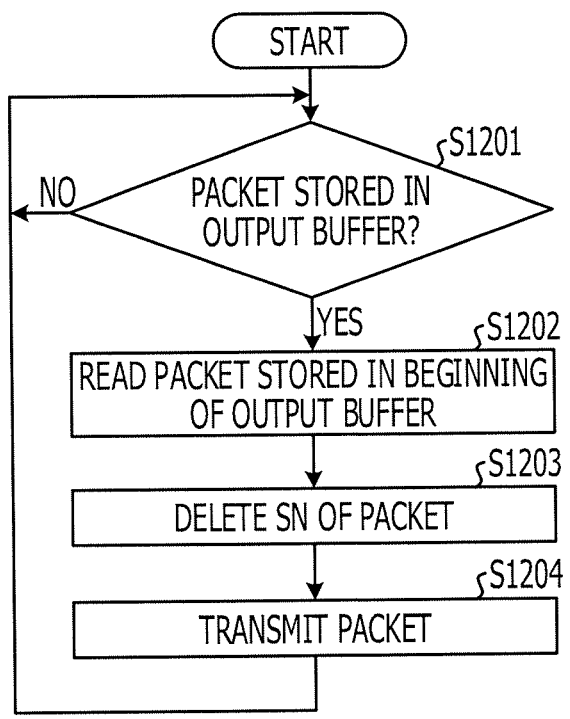
FIG. 12 is a flowchart illustrating a transmission process performed by the data transfer apparatus on the reception side.

FIG. 12 is a flowchart illustrating a transmission process performed by the data transfer apparatus on the reception side. The data transfer apparatus 140 performs the following processes, for example, in addition to the processes illustrated in FIGS. 10 and 11. First, the line IF unit 570 determines whether at least one packet has been stored in the output buffer 560 (S1201) and waits until a packet is stored in the output buffer 560 (S1201: proceeds to a loop of "No").

When a packet is stored in the output buffer 560 (S1201: Yes), the line IF unit 570 reads the packet stored in the beginning of the output buffer 560 (S1202). Thereafter, the line IF unit 570 deletes an SN of the packet read in S1202 (S1203).

Thereafter, the line IF unit 570 transmits the packet in which the SN thereof has been deleted in S1203 to the communication apparatus in the succeeding stage of the data transfer apparatus 140 (S1204), and the process returns to S1201. By performing the processes above, the data transfer apparatus 140 transmits packets which are received by the reception process illustrated in FIG. 10 to a communication apparatus in a succeeding stage.

As described above, according to the communication system 100 of the first embodiment, when a packet stored in a transmission buffer is to be discarded, one of the second to last packets is determined to be the packet of the discarding target and an SN of a discarded packet can be transmitted to a reception side after the SN of the discarded packet is added to a packet before the discarded packet. Accordingly, the reception side can recognize the SN of the packet discarded on the transmission side before a skip of the packet discarded on the transmission side is detected. Consequently, a reception of the packet discarded on the transmission side is not waited on the reception side and a delay time caused by waiting of the reception can be reduced.

In particular, when the links L1 and L2 are wireless links, change of the transmission speeds of the links L1 and L2 is large, and accordingly, it is likely that a packet stored in the transmission buffer is discarded. However, according to the communication system 100, a reception of the packet discarded on the transmission side is not waited on the reception side and a delay time caused by the waiting of the reception can be reduced.

Second Embodiment

In a second embodiment, a case where a plurality of data flows are transmitted from the data transfer apparatus 110 to the data transfer apparatus 140 will be described. Different portions between a communication system 100 of the second embodiment and the communication system 100 of the first embodiment will be described. Furthermore, a case where two data flows f1 and f2 are transmitted will be described as examples of the plurality of data flows.

Configuration of Data Transfer Apparatus on Transmission Side

Figure 13:
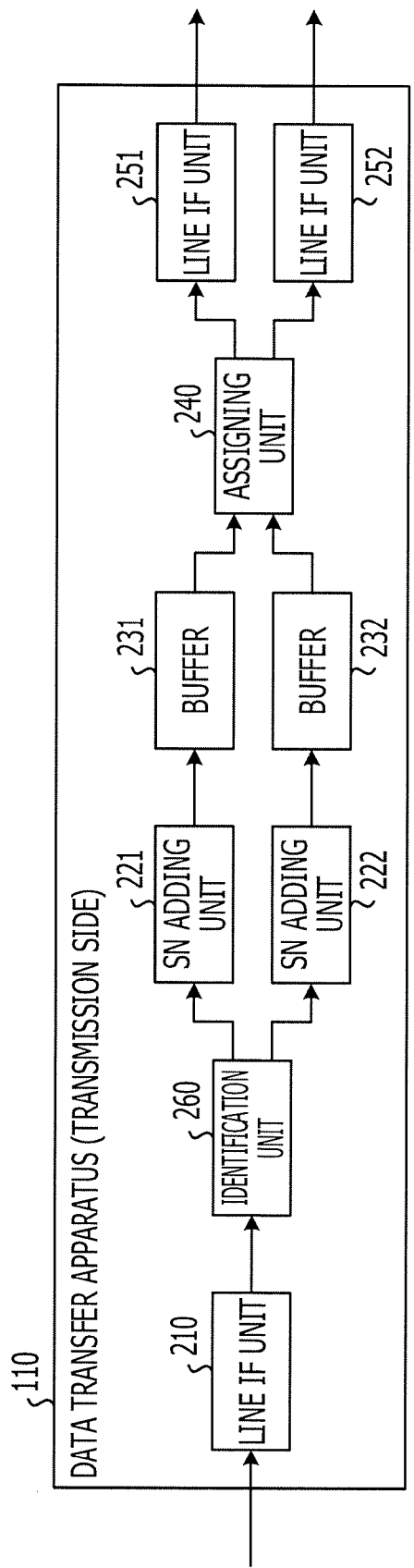
FIG. 13 is a diagram illustrating a configuration of a data transfer apparatus on a transmission side according to a second embodiment.

FIG. 13 is a diagram illustrating a configuration of a data transfer apparatus on a transmission side. In FIG. 13, components which are the same as those illustrated in FIG. 2 are denoted by reference numerals which are the same as those illustrated in FIG. 2, and descriptions thereof are omitted. As illustrated in FIG. 13, a data transfer apparatus 110 on the transmission side of the second embodiment includes, instead of the SN adding unit 220 and the buffer 230 illustrated in FIG. 2, an identification unit 260, SN adding units 221 and 222, and buffers 231 and 232.

A line IF unit 210 outputs a received packet to the identification unit 260. The identification unit 260 identifies a data flow (the data flow f1 or the data flow f2) of the packet output from the line IF unit 210. For example, the identification unit 260 identifies a data flow of the packet in accordance with information on a header of the packet (other identification units perform the same operation).

Header information includes, for example, a transmission source and a destination MAC address of an Ethernet header, a protocol type, a transmission source and a destination IP address of an IP header, a TCP/UDP protocol type, and a transmission source and a destination port number of a TCP header or a UDP header. The identification unit 260 outputs the packet supplied from the line IF unit 210 to one of the SN adding units 221 and 222 which corresponds to the identified data flow.

The SN adding units 221 and 222 correspond to the data flows f1 and f2, respectively. Each of the SN adding units 221 and 222 is the same as the buffer 230 illustrated in FIG. 2. Furthermore, the SN adding units 221 and 222 independently add SNs to packets. Therefore, SNs can be added to packets received by the data transfer apparatus 110 for each data flow. The SN adding units 221 and 222 store packets having SNs added thereto in the buffers 231 and 232, respectively.

The buffers 231 and 232 correspond to the data flows f1 and f2, respectively. An assigning unit 240 reads packets stored in the buffers 231 and 232 and outputs the packets to the line IF units 251 and 252. Note that the assigning units 240 may be provided for the individual data flows f1 and f2.

Configuration of Line Terminal Apparatus on Transmission Side

Figure 14:
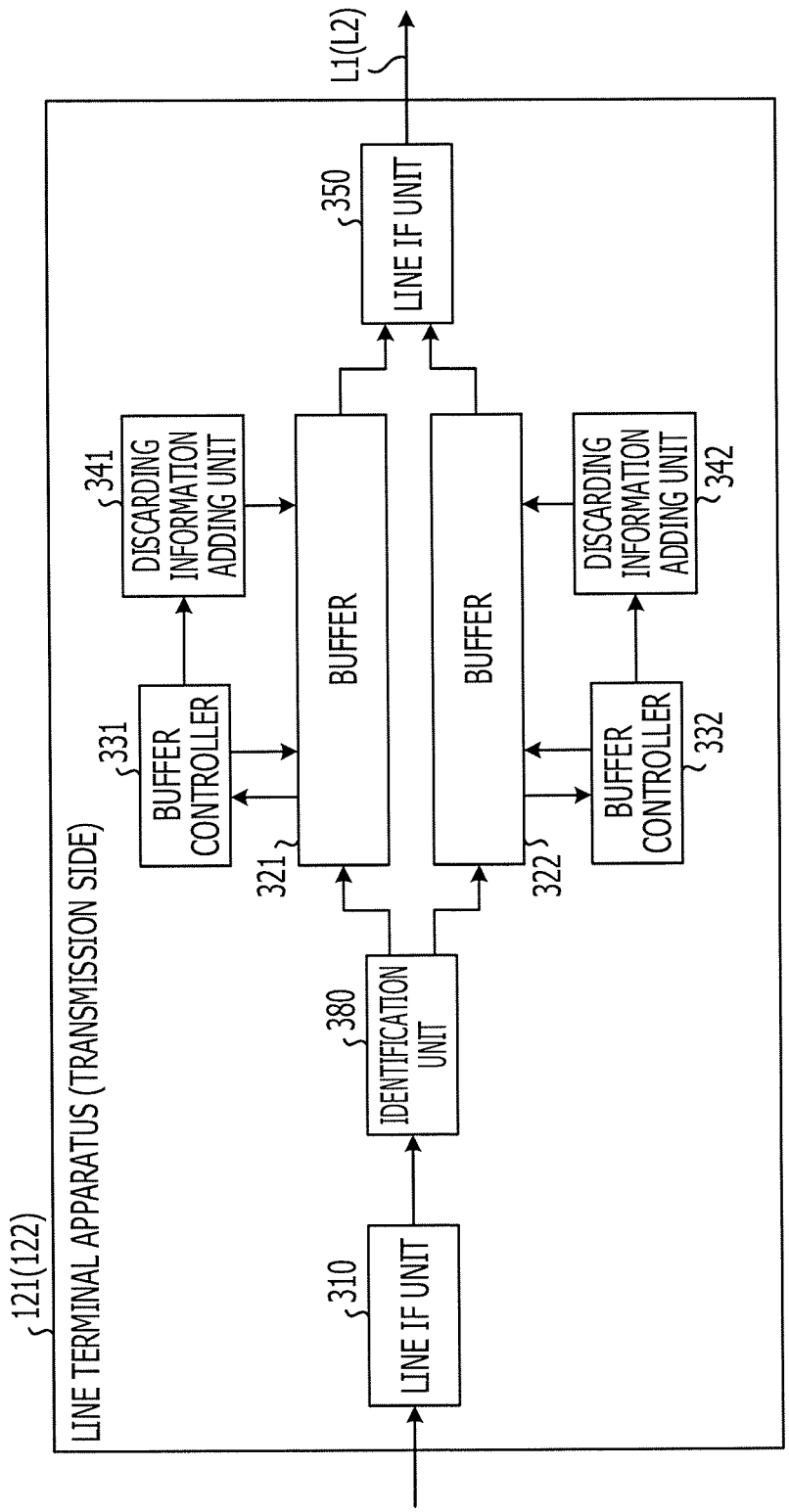
FIG. 14 is a diagram illustrating a configuration of a line terminal apparatus on the transmission side.

FIG. 14 is a diagram illustrating a configuration of a line terminal apparatus on the transmission side. In FIG. 14, components which are the same as those illustrated in FIG. 3 are denoted by reference numerals which are the same as those illustrated in FIG. 3, and descriptions thereof are omitted. As illustrated in FIG. 14, a line terminal apparatus 121 on the transmission side of the second embodiment includes, instead of the buffer 320 illustrated in FIG. 3, an identification unit 380 and buffers 321 and 322. The line terminal apparatus 121 further includes, instead of the buffer controller 330 and the discarding information adding unit 340 illustrated in FIG. 3, buffer controllers 331 and 332 and discarding information adding units 341 and 342. A line terminal apparatus 122 also has the same configuration.

A line IF unit 310 outputs a received packet to the identification unit 380. The identification unit 380 identifies a data flow (the data flow f1 or the data flow f2) of the packet output from the line IF unit 310. The identification unit 380 stores the packet supplied from the line IF unit 310 in an end of one of the buffers 321 and 322 which corresponds to the identified data flow.

The buffers 321 and 322 correspond to the data flows f1 and f2, respectively. The buffer controllers 331 and 332 correspond to the buffers 321 and 322, respectively. Each of the buffer controllers 331 and 332 is the same as the buffer controller 330 illustrated in FIG. 3. The discarding information adding units 341 and 342 correspond to the buffers 321 and 322, respectively. Each of the discarding information adding units 341 and 342 is the same as the discarding information adding unit 340 illustrated in FIG. 3. A line IF unit 350 reads packets stored in the buffers 321 and 322 and transmits the packets.

Configuration of Data Transfer Apparatus on Reception Side

Figure 15:
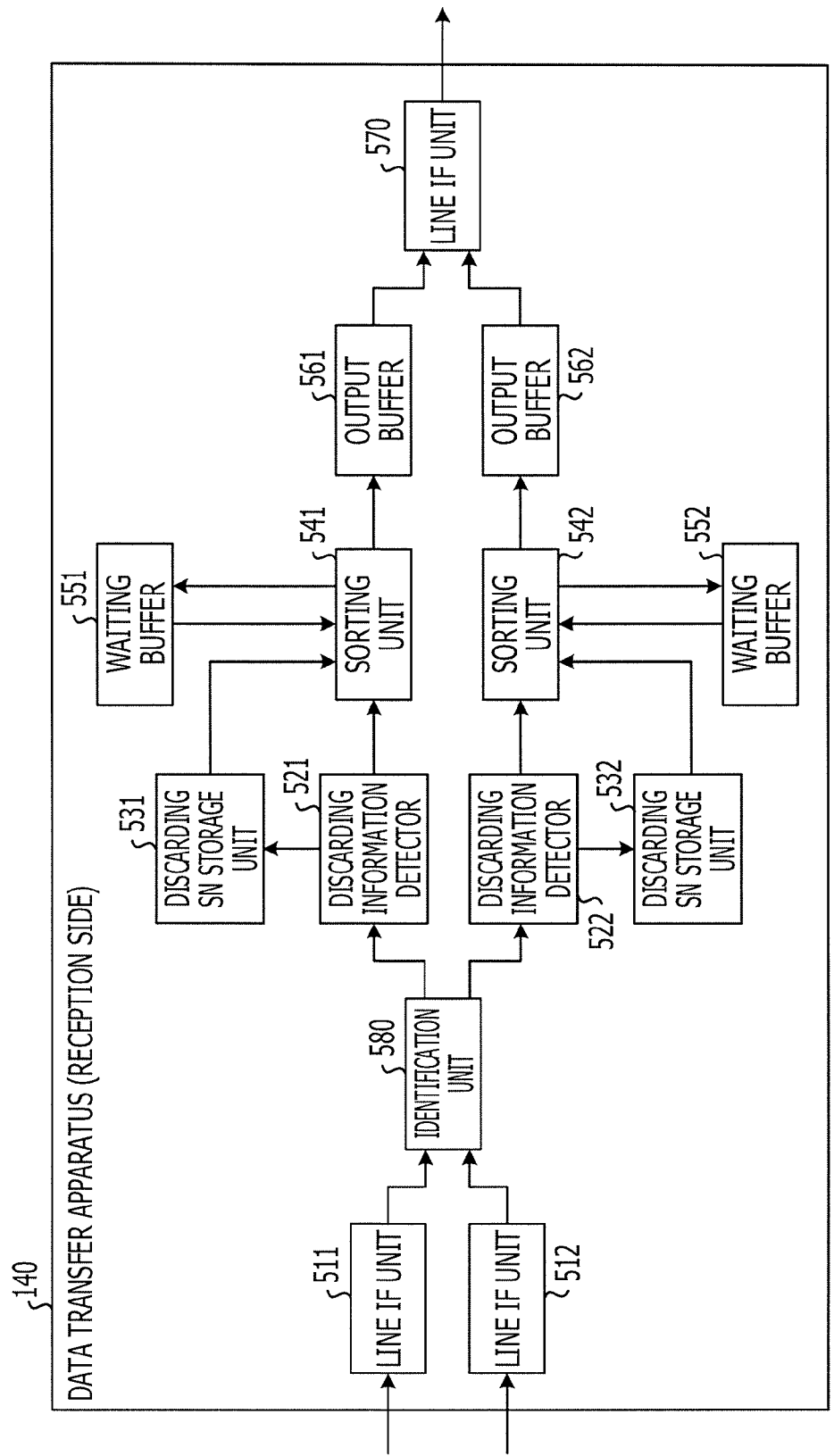
FIG. 15 is a diagram illustrating a configuration of a data transfer apparatus on a reception side.

FIG. 15 is a diagram illustrating a configuration of a data transfer apparatus on a reception side. In FIG. 15, components which are the same as those illustrated in FIG. 5 are denoted by reference numerals which are the same as those illustrated in FIG. 5, and descriptions thereof are omitted. As illustrated in FIG. 15, a data transfer apparatus 140 on the reception side of the second embodiment includes, instead of the discarding information detector 520 and discarding SN storage unit 530 illustrated in FIG. 5, an identification unit 580, discarding information detectors 521 and 522, and discarding SN storage units 531 and 532. The data transfer apparatus 140 further includes, instead of the sorting unit 540, the waiting buffer 550, and the output buffer 560, sorting units 541 and 542, waiting buffers 551 and 552, and output buffers 561 and 562 illustrated in FIG. 5.

Each of Line IF units 511 and 512 outputs a received packet to the identification unit 580. The identification unit 580 identifies a data flow (the data flow f1 or the data flow f2) of the packet output from one of the line IF units 511 and 512. The identification unit 580 outputs the packet supplied from one of the line IF units 511 and 512 to one of the discarding information detectors 521 and 522 which corresponds to the identified data flow.

The discarding information detectors 521 and 522 correspond to the data flows f1 and f2, respectively. Each of the discarding information detectors 521 and 522 is the same as the discarding information detector 520 illustrated in FIG. 5. Each of the discarding information detectors 521 and 522 stores an SN included in detected discarding information as a discarding SN in a corresponding one of the discarding SN storage units 531 and 532. Furthermore, each of the discarding information detectors 521 and 522 outputs the packet to a corresponding one of the sorting units 541 and 542.

The sorting units 541 and 542 correspond to the data flows f1 and f2, respectively. Each of the sorting units 541 and 542 is the same as the sorting unit 540 illustrated in FIG. 5. Each of the sorting units 541 and 542 stores a skipped packet in a corresponding one of the waiting buffers 551 and 552. Furthermore, each of the sorting units 541 and 542 stores a packet which has properly arrived in a corresponding one of the output buffers 561 and 562.

The waiting buffers 551 and 552 correspond to the data flows f1 and f2, respectively. The output buffers 561 and 562 correspond to the data flows f1 and f2, respectively. The line IF unit 570 reads and transmits packets stored in the output buffers 561 and 562.

Process of Data Transfer Apparatus on Transmission Side

Figure 16:
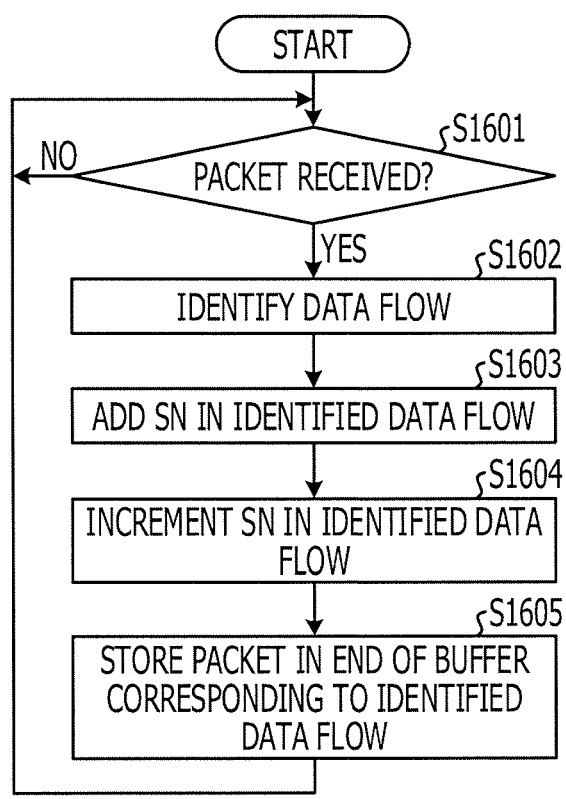
FIG. 16 is a flowchart illustrating a reception process performed by the data transfer apparatus on the transmission side.

FIG. 16 is a flowchart illustrating a reception process performed by the data transfer apparatus on the transmission side. The data transfer apparatus 110 of the second embodiment performs the following processes, for example. First, the line IF unit 210 determines whether a packet has been received from a communication apparatus in a preceding stage of the data transfer apparatus 110 (S1601) and waits until a packet is received (S1601: proceeds to a loop of "No").

In S1601, when a packet is received (S1601: Yes), the identification unit 260 identifies a data flow of the packet received in S1601 (S1602). The data transfer apparatus 110 adds an SN corresponding to the data flow identified in S1602 to the received packet (S1603). The process in S1603 is performed by one of the SN adding units 221 and 222 which corresponds to the identified data flow.

Subsequently, one of the SN adding units 221 and 222 which corresponds to the data flow increments the SN corresponding to the data flow (S1604). Thereafter, one of the SN adding units 221 and 222 which corresponds to the data flow stores the packet having the SN added thereto in S1603 in the end of one of the buffers 231 and 232 which corresponds to the data flow (S1605), and the process returns to S1601. In S1604, one of the buffers 231 and 232 corresponds to the identified data flow.

By performing the processes above, when receiving a packet, the data transfer apparatus 110 adds an SN to the received packet for each data flow and stores the packet having the SN added thereto in one of the buffers 231 and 232 which corresponds to the data flow.

Figure 17:
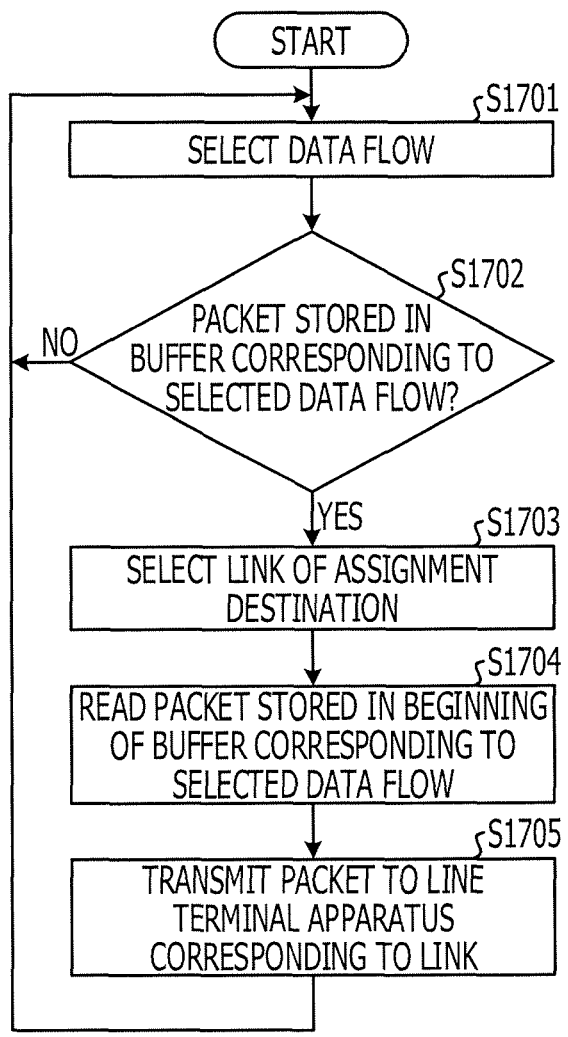
FIG. 17 is a flowchart illustrating a transmission process performed by the data transfer apparatus on the transmission side.

FIG. 17 is a flowchart illustrating a transmission process performed by the data transfer apparatus on the transmission side. The data transfer apparatus 110 on the transmission side of the second embodiment performs the following processes in addition to the reception operation illustrated in FIG. 16. First, the assigning unit 240 selects one of the data flows f1 and f2 from which a packet is to be read (S1701).

The selection of a data flow performed in S1701 will be described. For example, the assigning unit 240 changes a data flow to be selected every time the process in S1701 is performed. Alternatively, the assigning unit 240 may select a data flow in accordance with priority levels of data flows. The same is applied to selection of a data flow described below.

Subsequently, the assigning unit 240 determines whether at least one packet has been stored in one of the buffers 231 and 232 which corresponds to the data flow selected in S1701 (S1702). The assigning unit 240 waits until a packet is stored in one of the buffers 231 and 232 (S1702: proceeds to a loop of "No"). When a packet is stored (S1702: Yes), the assigning unit 240 selects one of the links L1 and L2 to which the packet is to be assigned (S1703). The assigning unit 240 selects one of the links L1 and L2 using the round-robin algorithm in accordance with transmission speeds of the links L1 and L2, for example.

Subsequently, the assigning unit 240 reads a packet stored in a beginning of one of the buffers 231 and 232 which corresponds to the data flow selected in S1701 (S1704). Subsequently, the assigning unit 240 transmits the packet read in S1704 to one of the line terminal apparatuses 121 and 122 which corresponds to one of the links L1 and L2 selected in S1703 (S1705).

Then the data transfer apparatus 110 returns to S1701. In S1705, the assigning unit 240 outputs the packet to one of the line IF units 251 and 252 which corresponds to the selected one of the links L1 and L2 so as to transmit the packet to one of the line terminal apparatuses 121 and 122 which corresponds to the selected one of the links L1 and L2.

By performing the processes above, the data transfer apparatus 110 assigns a packet of a data flow stored in one of the buffers 231 and 232 by the reception process illustrated in FIG. 16 to one of the links L1 and L2 so as to transmit the packet.

Process of Line Terminal Apparatus on Transmission Side

Figure 18:
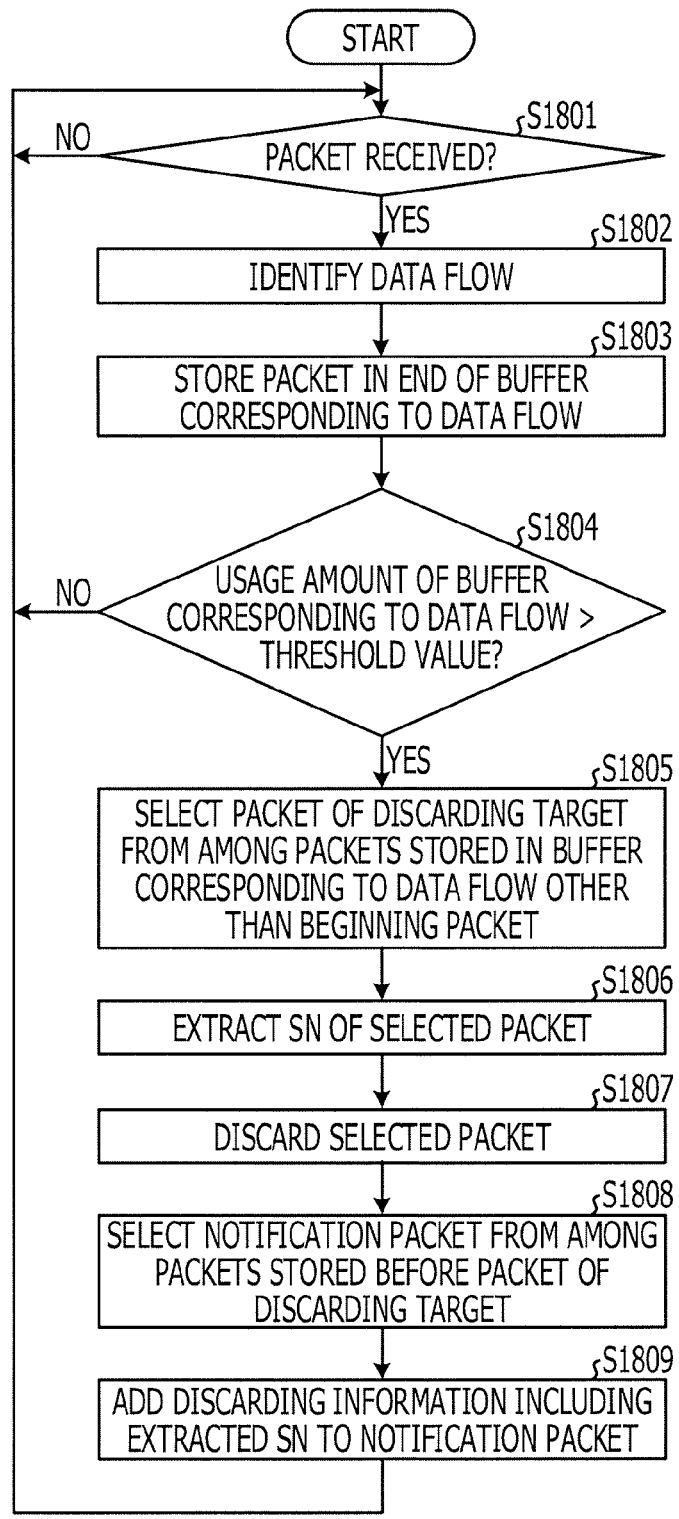
FIG. 18 is a flowchart illustrating a reception process performed by the line terminal apparatus on the transmission side.

FIG. 18 is a flowchart illustrating a reception process performed by the line terminal apparatus on the transmission side. Here, although a reception process performed by the line terminal apparatus 121 will be described, the line terminal apparatus 122 performs the same reception process. The line terminal apparatus 121 according to the second embodiment performs the following processes, for example. First, the line IF unit 310 determines whether a packet has been received from the data transfer apparatus 110 (S1801) and waits until a packet is received (S1801: proceeds to a loop of "No").

When a packet is received in S1801 (S1801: Yes), the identification unit 380 identifies a data flow of the packet received in S1801 (S1802). Subsequently, the identification unit 380 stores the packet received in S1801 in the end of one of the buffers 321 and 322 which corresponds to the data flow identified in S1802 (S1803).

The line terminal apparatus 121 determines whether a usage amount of one of the buffers 321 and 322 which corresponds to the data flow identified in S1802 exceeds a threshold value (S1804). The process in S1804 is performed by one of the buffer controllers 331 and 332 which corresponds to the data flow identified in S1802 (the same is applied to processes in S1805 to S1807).

Processes in S1805 to S1809 are the same as those of S804 to S808 illustrated in FIG. 8. Note that the processes in S1805 to S1809 are performed on the data flow identified in S1802.

By performing the processes above, when the usage amount of one of the buffers 321 and 322 exceeds the threshold value, the line terminal apparatus 121 discards a packet stored in one of the buffers 321 and 322 for each data flow and adds discarding information including an SN of the discarded packet to a packet having an SN which is smaller than that of the discarded packet.

Figure 19:
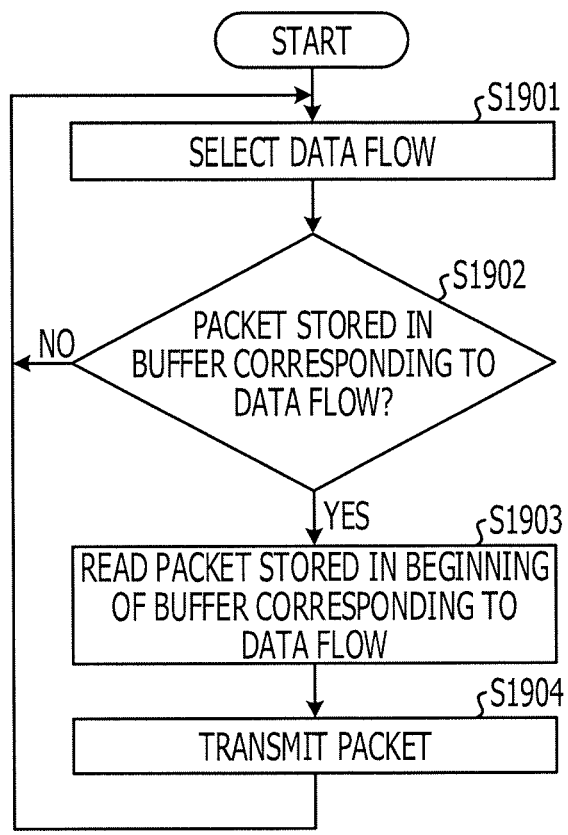
FIG. 19 is a flowchart illustrating a transmission process performed by the line terminal apparatus on the transmission side.

FIG. 19 is a flowchart illustrating a transmission process performed by the line terminal apparatus on the transmission side. Here, although a transmission process performed by the line terminal apparatus 121 will be described, the line terminal apparatus 122 performs the same transmission process. The line terminal apparatus 121 according to the second embodiment performs the following processes, for example, in addition to the reception process illustrated in FIG. 18.

First, the line IF unit 350 selects one of the data flows f1 and f2 from which a packet is to be read (S1901). Subsequently, the line IF unit 350 determines whether at least one packet has been stored in one of the buffers 321 and 322 which corresponds to the data flow selected in S1901 (S1902). The line IF unit 350 waits until a packet is stored in one of the buffers 321 and 322 (S1902: proceeds to a loop of "No").

In S1902, when a packet is stored in one of the buffers 321 and 322 (S1902: Yes), the line IF unit 350 reads a packet stored in the beginning of the one of the buffers 321 and 322 (S1903). Thereafter, the line IF unit 350 transmits the packet read in S1903 (S1904), and the process returns to S1901.

By performing the processes above, the line terminal apparatus 121 transmits a packet stored in one of the buffers 321 and 322 for each data flow by the reception process illustrated in FIG. 18 to the link L1.

Process of Data Transfer Apparatus on Reception Side

Figure 20:
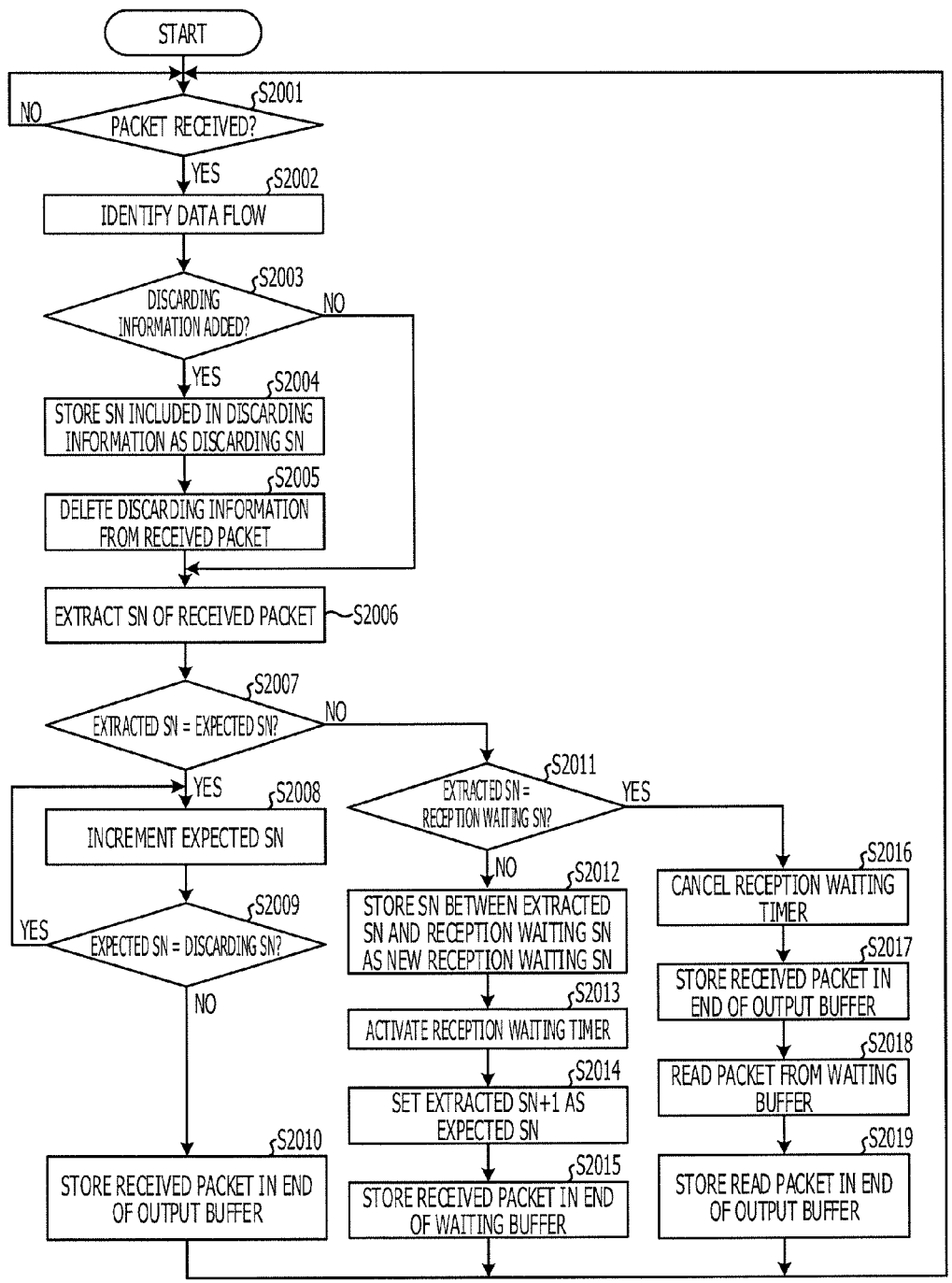
FIG. 20 is a flowchart illustrating a reception process performed by the data transfer apparatus on the reception side.

FIG. 20 is a flowchart illustrating a reception process performed by the data transfer apparatus on the reception side. The data transfer apparatus 140 on the reception side according to the second embodiment performs the following processes, for example. First, one of the line IF units 511 and 512 determines whether a packet has been received from a corresponding one of the line terminal apparatuses 131 and 132 (S2001) and waits until a packet is received (S2001: proceeds to a loop of "No"). When a packet is received (S2001: Yes), the identification unit 580 identifies a data flow of the packet received in S2001 (S2002).

Processes in S2003 to S2019 illustrated in FIG. 20 are the same as those of S1002 to S1018 illustrated in FIG. 10. Note that the processes in S2003 to S2019 are performed for each data flow identified in S2002. Furthermore, the timer management process described with reference to FIG. 1A is also performed for each data flow identified in S2002.

Figure 21:
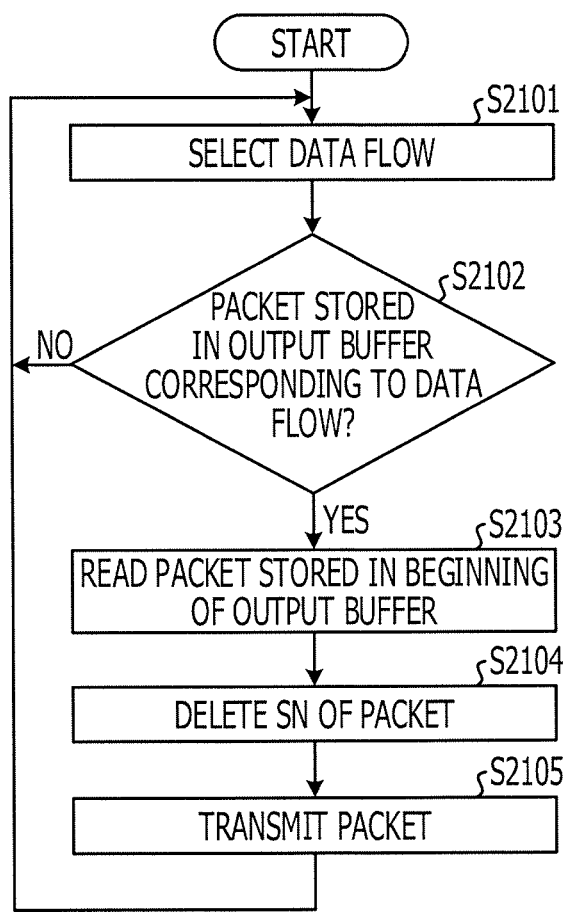
FIG. 21 is a flowchart illustrating a transmission process performed by the data transfer apparatus on the reception side.

FIG. 21 is a flowchart illustrating a transmission process performed by the data transfer apparatus on the reception side. The data transfer apparatus 140 according to the second embodiment performs the following processes, for example, in addition to the processes illustrated in FIG. 20. First, the line IF unit 570 selects one of the data flows f1 and f2 from which a packet is to be read (S2101).

Subsequently, the line IF unit 570 determines whether at least one packet has been stored in one of the output buffers 561 and 562 which corresponds to the data flow selected in S2101 (S2102). The line IF unit 570 waits until a packet is stored in one of the output buffers 561 and 562 (S2102: proceeds to a loop of "No").

In S2102, when a packet is stored in one of the output buffers 561 and 562 (S2102: Yes), the line IF unit 570 reads a packet stored in a beginning of the one of the output buffers 561 and 562 (S2103). Thereafter, the line IF unit 570 deletes an SN of the packet read in S2103 (S2104).

Thereafter, the line IF unit 570 transmits the packet in which the SN thereof has been deleted in S2104 to a communication apparatus in a succeeding stage of the data transfer apparatus 140 (S2105), and the process returns to S2101. By performing the processes above, the data transfer apparatus 140 transmits packets which are received and sorted by the reception process illustrated in FIG. 10 to the communication apparatus in the succeeding stage.

As described above, according to the communication system 100 of the second embodiment, even when a plurality of data flows are transmitted from the data transfer apparatus 110 to the data transfer apparatus 140, as with the first embodiment, a delay time caused by waiting of a reception can be reduced.

Third Embodiment

Communication System of Third Embodiment

Figure 22A:
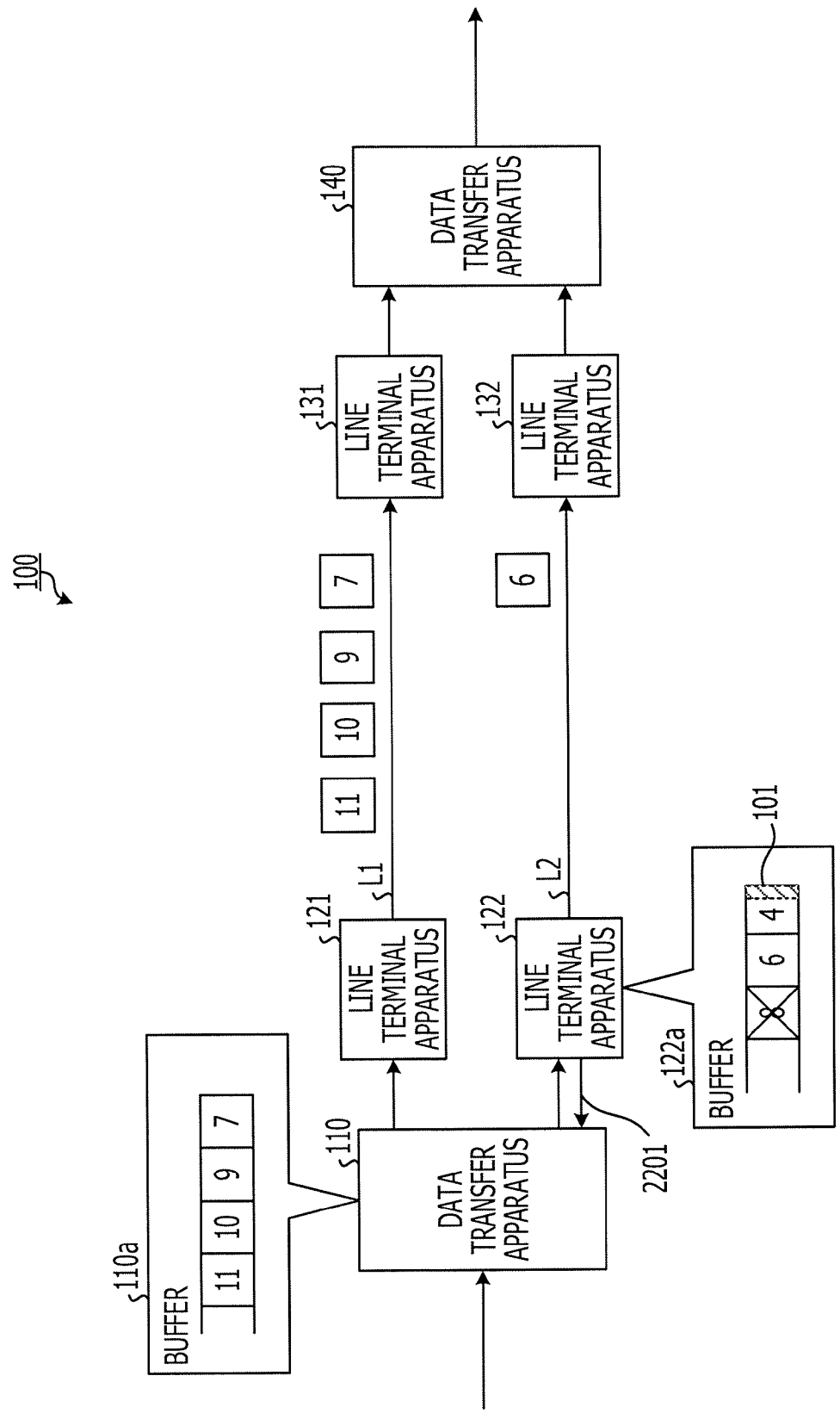
FIG. 22A is a diagram illustrating a communication system according to a third embodiment (part 1)
Figure 22B:
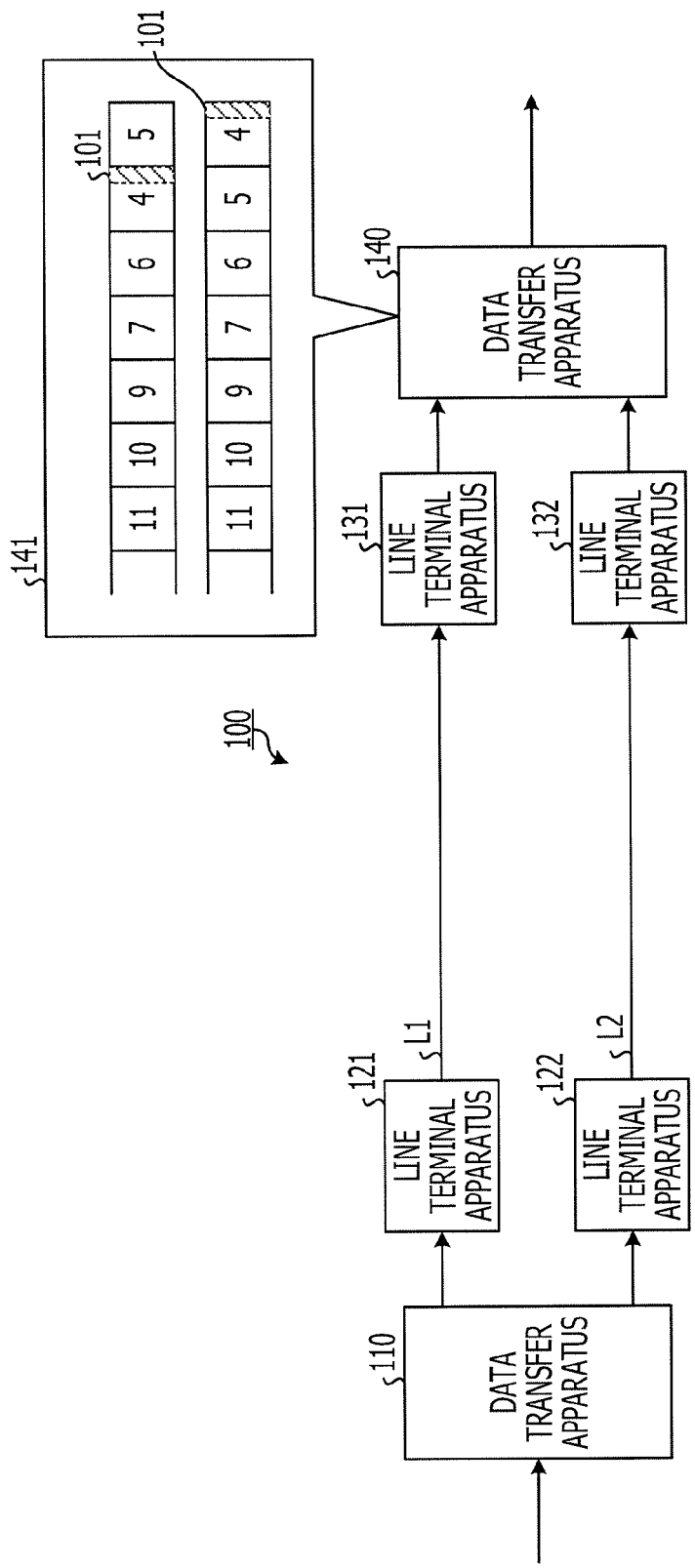
FIG. 22B is a diagram illustrating the communication system according to the third embodiment (part 2)

FIG. 22A is a diagram illustrating a communication system according to a third embodiment (part 1). FIG. 22B is a diagram illustrating the communication system according to the third embodiment (part 2). In FIGS. 22A and 22B, components which are the same as those illustrated in FIGS. 1A and 1B are denoted by reference numerals which are the same as those illustrated in FIGS. 1A and 1B, and descriptions thereof are omitted.

In the example of FIG. 22A, packets having SNs of "4", "6", and "8" are stored in a buffer 122a of a line terminal apparatus 122. The line terminal apparatus 122 according to the third embodiment selects a packet stored in an end of the buffer 122a from among the packets stored in the buffer 122a as a packet of a discarding target when a discarding condition is satisfied. In the example of FIG. 22A, the packet having the SN of "8" is selected as a discarding target. It is assumed that the line terminal apparatus 122 adds discarding information 101 to the packet having the SN of "4".

Furthermore, the line terminal apparatus 122 according to the third embodiment transmits, as denoted by a reference numeral 2201, discarding notification information representing that a packet has been discarded from the buffer 122a to a data transfer apparatus 110. The transmission of the discarding notification information can be performed using a control message supplied through a control communication path.

After receiving the discarding notification information from the line terminal apparatus 122, the data transfer apparatus 110 assigns packets supplied hereafter only to a link L1. A buffer 110a is included in the data transfer apparatus 110 (the same as the buffer 230 illustrated in FIG. 2). It is assumed that the buffer 110a of the data transfer apparatus 110 stores packets having SNs of "7", "9", "10", and "11" which have not been assigned to links L1 and L2.

The data transfer apparatus 110 assigns the packets stored in the buffer 110a to the link L1. Accordingly, the packets after the packet discarded by the line terminal apparatus 122 are transmitted to the link L1 in which packet discarding has not occurred and change of an order of the packets does not occur in transmission.

As denoted by an arrival order 141 illustrated in FIG. 22B, it is assumed that a data transfer apparatus 140 receives packets having the SNs of "5", "4", "6", "7", "9", "10", and "11" in this order. Since the data transfer apparatus 140 receives the packet having the SN of "5" before the packet having the SN of "4", the data transfer apparatus 140 stores the packet having the SN of "5" in a buffer (for example, the waiting buffer 550 illustrated in FIG. 5) and waits a reception of the packet having the SN of "4".

When receiving the packet having the SN of "4", the data transfer apparatus 140 outputs the packet having the SN of "4" and thereafter outputs the packet having the SN of "5" so as to perform sorting. Furthermore, the data transfer apparatus 140 does not wait a reception of the packet having the SN of "8" which has been discarded on a transmission side in accordance with the discarding information added to the packet having the SN of "4".

Furthermore, the data transfer apparatus 140 determines that a skip of a packet is caused by a lost of a packet in transmission since an order of the packets having the SNs larger than "8" does not change. Therefore, the data transfer apparatus 140 does not sort the packets having the SNs larger than the SN included in the discarding information and outputs the packets every time the packet is received.

Accordingly, the data transfer apparatus 140 does not wait not only a reception of a packet discarded on the transmission side but also receptions of packets to be received after discarding. Therefore, a delay time caused by waiting of receptions of packets can be further reduced.

Note that the line terminal apparatus 122 may transmit the discarding notification information to the data transfer apparatus 110 and receive a response signal to the transmitted discarding notification information from the data transfer apparatus 110 before discarding a packet stored in the end of the buffer 122a. In this case, when receiving the discarding notification information from the line terminal apparatus 122, the data transfer apparatus 110 transmits the response signal to the line terminal apparatus 122.

Furthermore, when a predetermined condition is satisfied, the data transfer apparatus 110 cancels the state in which packets are assigned only to the link L1 and returns to the state in which packets are assigned to the links L1 and L2. Examples of the predetermined condition include a condition in which the usage amount of the buffer 122a becomes smaller than a threshold value, a condition in which a predetermined period of time is elapsed, and a condition in which communication quality of the link L2 is improved and exceeds a threshold value.

When the state in which packets are assigned to the links L1 and L2 is to be entered again, the data transfer apparatus 110 transmits a control message to the data transfer apparatus 140, for example. When receiving the control message from the data transfer apparatus 110, the data transfer apparatus 140 restarts the process of sorting packets.

Configuration of Data Transfer Apparatus on Transmission Side

Figure 23:
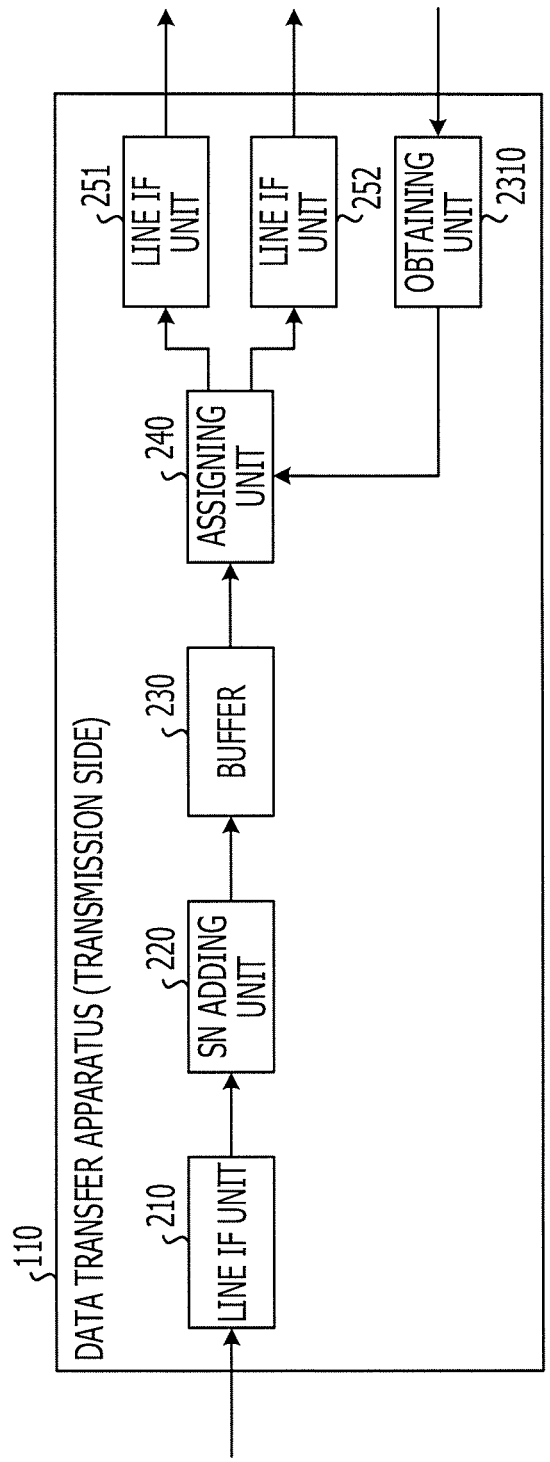
FIG. 23 is a diagram illustrating a configuration of a data transfer apparatus on a transmission side.

FIG. 23 is a diagram illustrating a configuration of the data transfer apparatus on the transmission side. In FIG. 23, components which are the same as those illustrated in FIG. 2 are denoted by reference numerals which are the same as those illustrated in FIG. 2, and descriptions thereof are omitted. As illustrated in FIG. 23, the line terminal apparatus 110 on the transmission side of the third embodiment includes, in addition to the configuration illustrated in FIG. 2, an obtaining unit 2310.

The obtaining unit 2310 obtains discarding notification information representing that a packet has been discarded from a buffer from the line terminal apparatuses 121 and 122. The obtaining unit 2310 outputs the obtained discarding notification information to an assigning unit 240. After the obtaining unit 2310 outputs the discarding notification information, the assigning unit 240 assigns packets stored in a buffer 230 to one of the links L1 and L2 which is not a transmission source of the discarding notification information.

Configuration of Line Terminal Apparatus on Transmission Side

Figure 24:
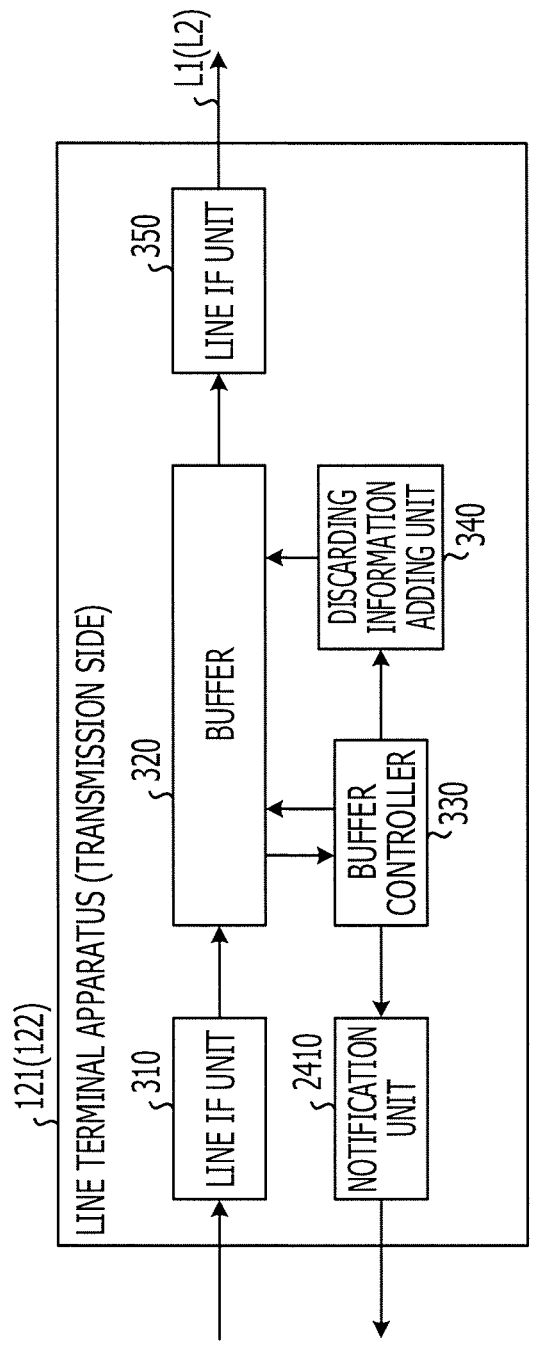
FIG. 24 is a diagram illustrating a configuration of a line terminal apparatus on the transmission side.

FIG. 24 is a diagram illustrating a configuration of the line terminal apparatus on the transmission side. In FIG. 24, components which are the same as those illustrated in FIG. 3 are denoted by reference numerals which are the same as those illustrated in FIG. 3, and descriptions thereof are omitted. As illustrated in FIG. 24, the line terminal apparatus 121 (or the line terminal apparatus 122) according to the third embodiment includes, in addition to the configuration illustrated in FIG. 3, a notification unit 2410.

When a discarding condition is satisfied, the buffer controller 330 selects a packet stored in an end of the buffer 320 as a discarding target. Then the buffer controller 330 outputs discarding notification information representing that discarding of a packet occurs to the notification unit 2410. The notification unit 2410 transmits the discarding notification information supplied from the buffer controller 330 to the data transfer apparatus 110 so as to transmit a back pressure notification representing that discarding of a packet occurs in the line terminal apparatus 121 to the data transfer apparatus 110.

Configuration of Data Transfer Apparatus on Reception Side

A configuration of the data transfer apparatus 140 on the reception side according to the third embodiment is the same as that illustrated in FIG. 5. Note that, when an SN of a packet output from a discarding information detector 520 is larger than an SN which has been stored in a discarding SN storage unit 530, a sorting unit 540 stores the packet output from the discarding information detector 520 in an output buffer 560.

Process of Data Transfer Apparatus on Transmission Side

Figure 25:
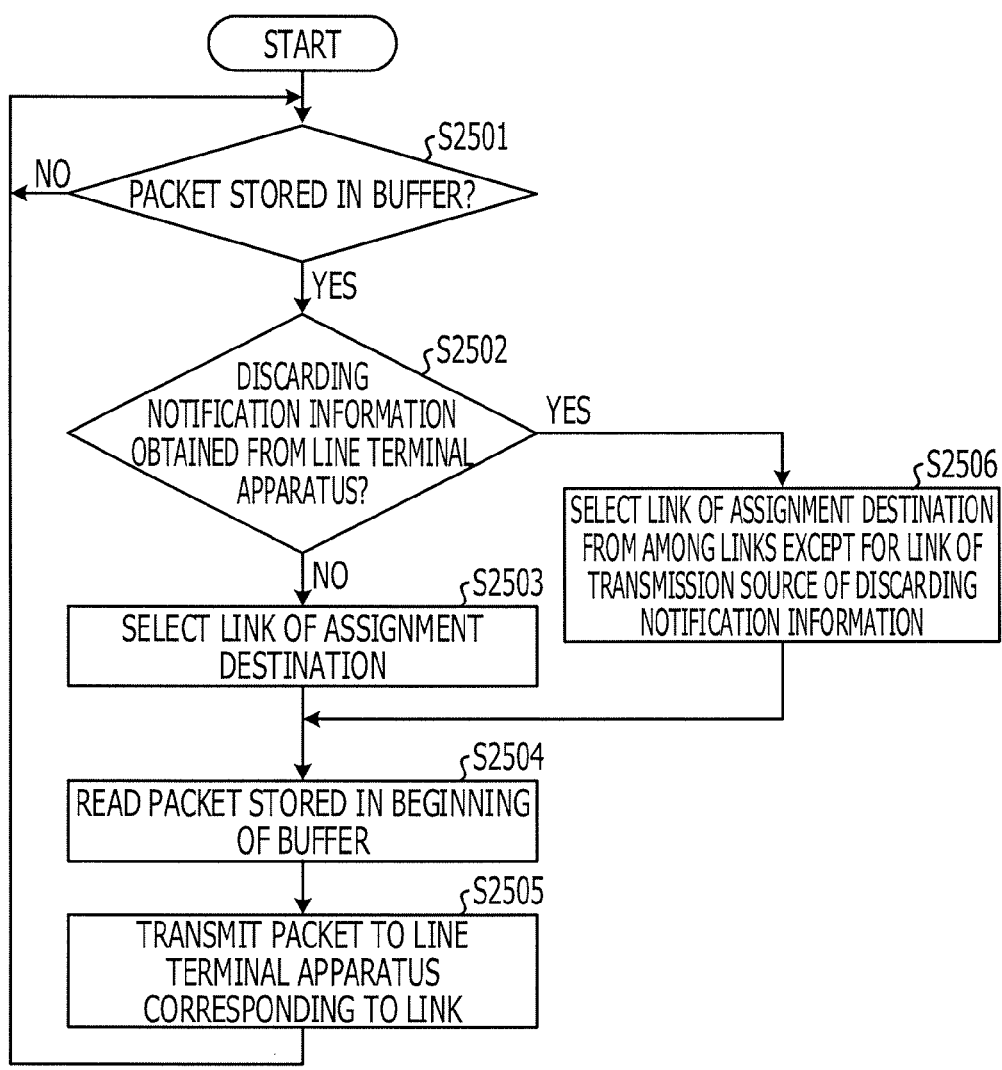
FIG. 25 is a flowchart illustrating a reception process performed by the data transfer apparatus on the transmission side.

FIG. 25 is a flowchart illustrating a reception process performed by the data transfer apparatus on the transmission side. The data transfer apparatus 110 on the transmission side according to the third embodiment performs the following processes, for example, in addition to the reception operation illustrated in FIG. 6. First, the assigning unit 240 determines whether at least one packet has been stored in the buffer 230 (S2501), and waits until a packet is stored in the buffer 230 (S2501: proceeds to a loop of "No").

In S2501, when a packet is stored in the buffer 230 (S2501: Yes), the obtaining unit 2310 determines whether discarding notification information has been received from one of the line terminal apparatuses 121 and 122 (S2502). When the discarding notification information has not been received (S2502: No), the data transfer apparatus 110 proceeds to S2503. Processes in S2503 to S2505 illustrated in FIG. 25 are the same as those of S702 to S704 illustrated in FIG. 7.

In S2502, when the discarding notification information has been obtained (S2502: Yes), the assigning unit 240 selects one of the links L1 and L2 which is not a transmission source of the discarding notification information (S2506). Then the data transfer apparatus 110 proceeds to S2504. In this case, the assigning unit 240 transmits a packet to one of the line terminal apparatuses 121 and 122 which corresponds to one of the links L1 and L2 selected in S2503.

By performing the processes above, the data transfer apparatus 110 assigns a packet stored in the buffer 230 by the reception process illustrated in FIG. 6 to one of the links L1 and L2 so as to transmit the packet. Furthermore, when discarding of a packet occurs in one of the line terminal apparatuses 121 and 122, packets can be transmitted through a link in which the packet discarding has not occurred.

When three or more links are used in the communication system 100, the assigning unit 240 selects one of the links which has the highest transmission speed and which is not a transmission source of discarding notification information in S2503, for example. In this way, a transmission delay caused by a case where only one link is used for transmission of packets is reduced.

Process of Line Terminal Apparatus on Transmission Side

Figure 26:
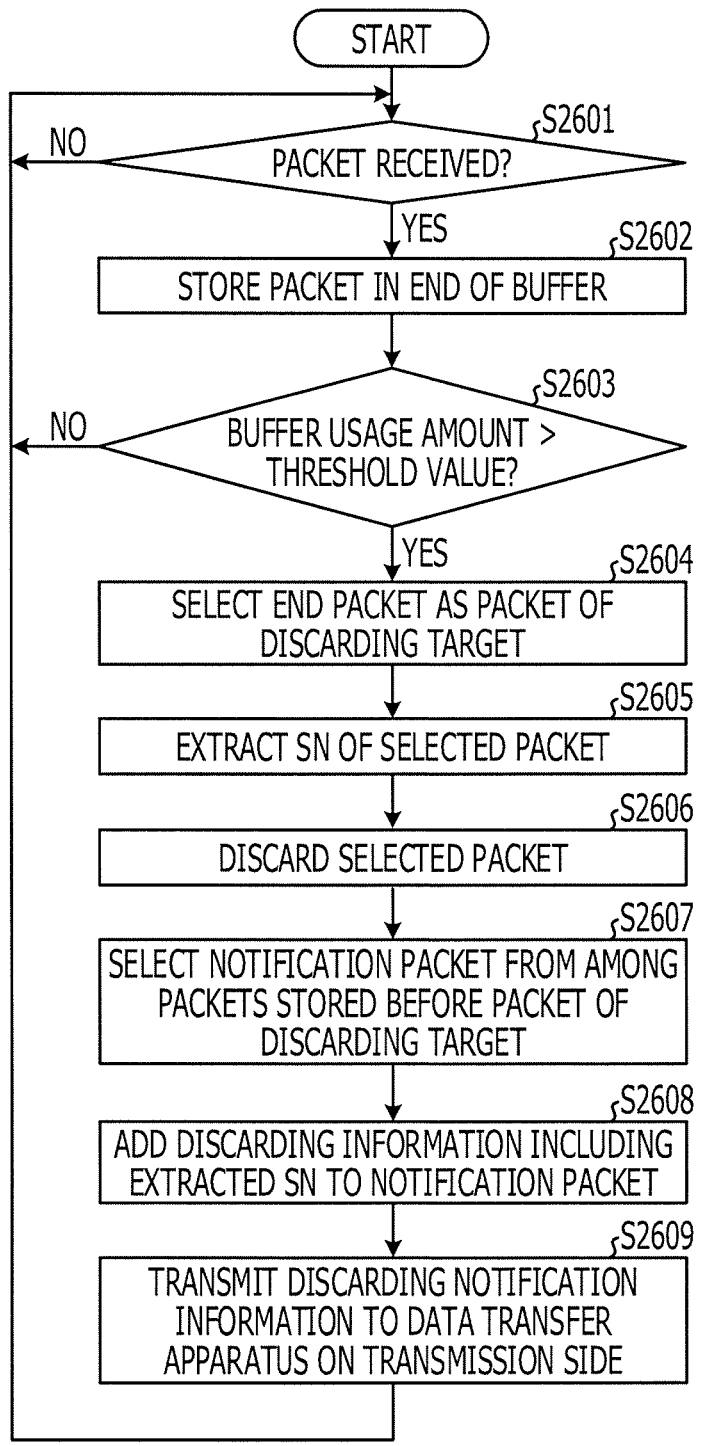
FIG. 26 is a flowchart illustrating a reception process performed by the line terminal apparatus on the transmission side.

FIG. 26 is a flowchart illustrating a reception process performed by the line terminal apparatus on the transmission side. Here, although a reception process performed by the line terminal apparatus 121 will be described, the line terminal apparatus 122 performs the same reception process. The line terminal apparatus 121 according to the third embodiment performs the following processes, for example. Processes in S2601 to S2608 illustrated in FIG. 26 are the same as those of S801 to S808 illustrated in FIG. 8.

Note that, in S2604, the buffer controller 330 selects a packet stored in the end of the buffer 320 as a packet of a discarding target (S2604). After the process of S2608, the notification unit 2410 transmits discarding notification information to the data transfer apparatus 110 on the transmission side (S2609) and the series of processes is terminated.

By performing the processes above, when the usage amount of the buffer 320 exceeds the threshold value, the line terminal apparatus 121 discards a packet stored in the end of the buffer 320 and adds discarding information including an SN of the discarded packet to a packet having an SN which is smaller than that of the discarded packet. Furthermore, the line terminal apparatus 121 can transmit discarding notification information including an SN of the discarded packet to the data transfer apparatus 110.

Process of Data Transfer Apparatus on Reception Side

Figure 27:
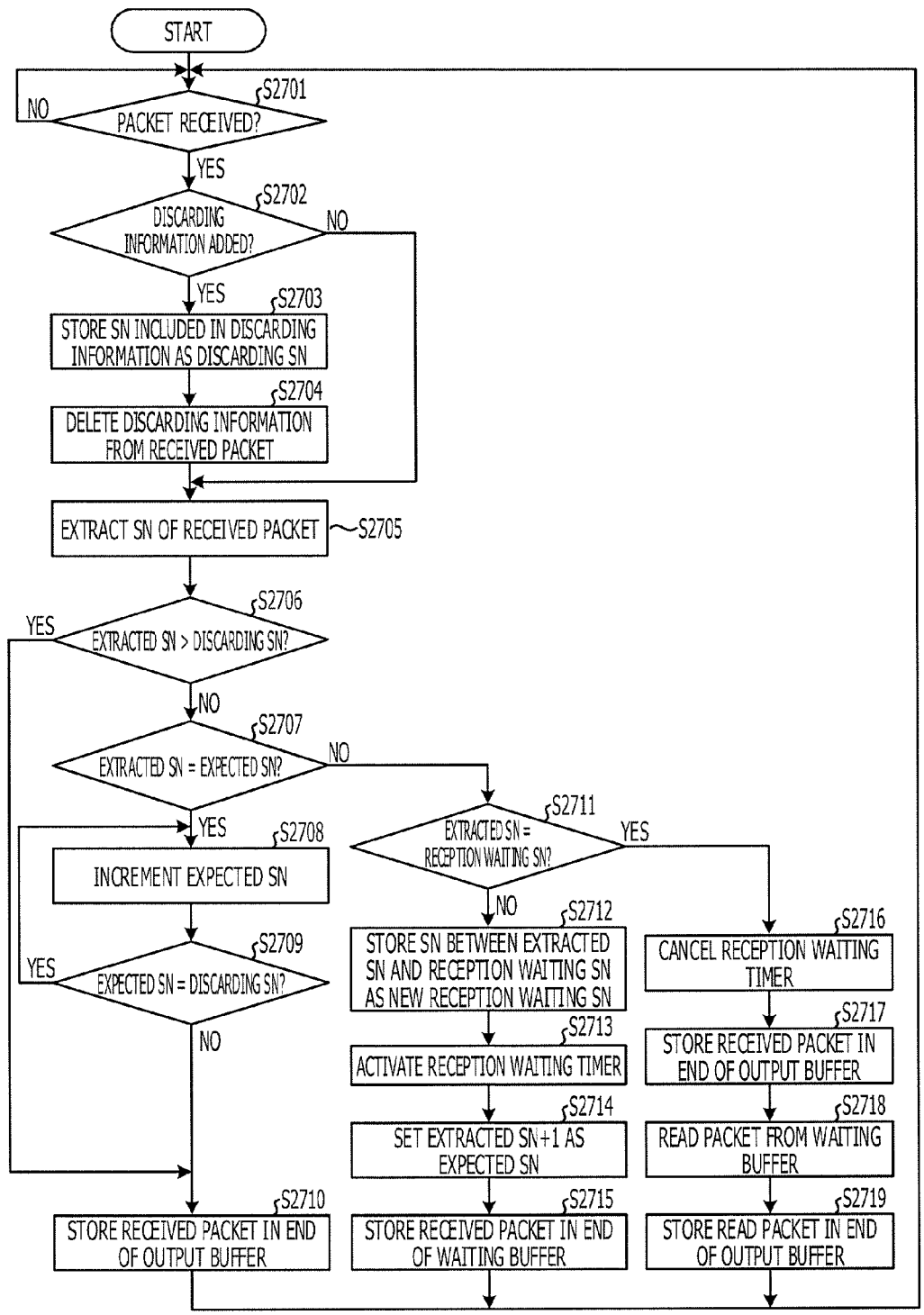
FIG. 27 is a flowchart illustrating a reception process performed by a data transfer apparatus on a reception side.

FIG. 27 is a flowchart illustrating a reception process performed by the data transfer apparatus on the reception side. The data transfer apparatus 140 according to the third embodiment performs the following processes, for example. Processes in S2701 to S2705 illustrated in FIG. 27 are the same as those of S1001 to S1005 illustrated in FIG. 10.

After the process in S2705, the sorting unit 540 determines whether an SN extracted in S2705 is larger than a discarded SN stored in the discarding SN storage unit 530 (S2706). When the extracted SN is larger than the discarded SN (S2706: Yes), the data transfer apparatus 140 proceeds to S2710. When the extracted SN is not larger than the discarded SN (S2706: No), the data transfer apparatus 140 proceeds to S2707. Processes in S2707 to S2719 are the same as those of S1006 to S1018 illustrated in FIG. 10.

By performing the processes above, the data transfer apparatus 140 stores packets received after a packet discarded on the transmission side in the buffer 560 without sorting. Specifically, the data transfer apparatus 140 outputs packets having SNs which are larger than an SN specified by discarding information without sorting.

According to the communication system 100 of the third embodiment, effects the same as those obtained by the communication system 100 of the first embodiment can be obtained. Furthermore, packets to be received after a packet discarded on the transmission side can be sequentially output without sorting. Accordingly, a delay time caused by waiting of a reception can be further reduced.

In particular, when one of transmission speeds of the links L1 and L2 is lowered, and therefore, a convergence state is continued in one of the line terminal apparatuses 121 and 122, a sorting process can be stopped on the reception side. Accordingly, a delay time can be reduced. Furthermore, when the convergence state is continued, transmission of discarding information performed every time packet discarding occurs can be avoided.

As described above, according to the relay apparatus, the reception apparatus, the transmission system, the communication system, and the relay method, a delay time can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay apparatus in a communication system including a transmission apparatus and a reception apparatus which is coupled to the transmission apparatus through a plurality of communication routes via a plurality of relay apparatuses which include the relay apparatus and forward packets transmitted from the transmission apparatus for the reception apparatus, the relay apparatus comprising:
   a receiver configured to receive distributed sequential packets from the transmission apparatus which distributes sequential packets for the reception apparatus among the plurality of relay apparatuses;
   a memory configured to store distributed sequential packets of the sequential packets in sequential order, the distributed sequential packets are distributed and transmitted to the relay apparatus by the transmission apparatus; and
   a processor configured
   to select a discard packet from the distributed sequential packets based on a discard condition, and
   to add a discard information to a previous packet and to transmit the previous packet, the discard information indicates a sequence number of the discard packet to be discarded, and the previous packet is one of the distributed sequential packets before the discard packet in sequential order.

2. The relay apparatus according to the claim 1, wherein the discard condition is determined based on a size of a free space of a buffer in the memory.

3. The relay apparatus according to the claim 1, wherein the relay apparatus adds the discard information in a header of the previous packet.

4. The relay apparatus according to the claim 1, wherein the relay apparatus selects the discard packet other than a beginning packet in the memory, in sequential order.

5. The relay apparatus according to the claim 1, wherein the discard information indicates a difference between a sequence number of the discard packet and a sequence number of the previous packet.

6. The relay apparatus according to the claim 1, wherein the reception apparatus receives the sequential packets via the plurality of relay apparatuses respectively, and the reception apparatus transmits the sequential packets in sequential order, without waiting a reception of the discard packet based on the discard information.

7. A reception apparatus in a communication system including a transmission apparatus and the reception apparatus which is coupled to the transmission apparatus through a plurality of communication routes via a plurality of relay apparatuses which forward packets transmitted from the transmission apparatus for the reception apparatus, the reception apparatus comprising:
- a receiver configured to receive sequential packets from the transmission apparatus via the plurality of relay apparatuses respectively, the transmission apparatus distributing the sequential packets for the reception apparatus among the plurality of relay apparatuses, for each relay apparatus of the plurality of the relay apparatuses, the relay apparatus storing distributed sequential packets of the sequential packets in a memory in sequential order, the distributed sequential packets are distributed and transmitted to the relay apparatus by the transmission apparatus, selecting a discard packet from the distributed sequential packets based on a discard condition, and adding a discard information to a previous packet and to transmit the previous packet, the discard information indicates a sequence number of the discard packet to be discarded, and the previous packet is one of the distributed sequential packets before the discard packet in sequential order; and
- a transmitter configured to transmit the sequential packets in sequential order, without waiting a reception of the discard packet based on the discard information.

8. A communication system comprising:
a transmission apparatus;
a plurality of relay apparatuses; and
a reception apparatus which is coupled to the transmission apparatus through a plurality of communication routes via the plurality of relay apparatuses which forward packets transmitted from the transmission apparatus for the reception apparatus;
wherein
the transmission apparatus is configured
to distribute sequential packets for the reception apparatus among the plurality of relay apparatuses, and
to transmit the sequential packets to the plurality of relay apparatuses respectively, and
for each relay apparatus of the plurality of the relay apparatuses, the relay apparatus is configured
to store distributed sequential packets of the sequential packets in a memory in sequential order, the distributed sequential packets are distributed and transmitted to the relay apparatus by the transmission apparatus,
to select a discard packet from the distributed sequential packets based on a discard condition, and
to add a discard information to a previous packet and to transmit the previous packet, the discard information indicates a sequence number of the discard packet to be discarded, and the previous packet is one of the distributed sequential packets before the discard packet in sequential order.

9. The communication system according to the claim 8, wherein the discard condition is determined based on a size of a free space of a buffer in the memory.

10. The communication system according to the claim 8, wherein the relay apparatus adds the discard information in a header of the previous packet.

11. The communication system according to the claim 8, wherein the relay apparatus selects the discard packet other than a beginning packet in the memory, in sequential order.

12. The communication system according to the claim 8, wherein the discard information indicates a difference between a sequence number of the discard packet and a sequence number of the previous packet.

13. The communication system according to the claim 8, wherein the reception apparatus receives the sequential packets via the plurality of relay apparatuses respectively, and the reception apparatus transmits the sequential packets in sequential order, without waiting a reception of the discard packet based on the discard information.

* * * * *